United States Patent
Cho et al.

(10) Patent No.: US 8,565,830 B2
(45) Date of Patent: Oct. 22, 2013

(54) MOBILE TERMINAL AND METHOD OF DISPLAYING 3D IMAGES THEREON

(75) Inventors: Seonhwi Cho, Seoul (KR); Baik Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/035,021

(22) Filed: Feb. 25, 2011

(65) Prior Publication Data

US 2011/0281619 A1  Nov. 17, 2011

(30) Foreign Application Priority Data

May 12, 2010 (KR) ........................ 10-2010-0044366
Jul. 5, 2010 (KR) ........................ 10-2010-0064236

(51) Int. Cl.
*H04M 1/00* (2006.01)

(52) U.S. Cl.
USPC ........ 455/566; 455/457; 455/556.2; 345/419; 345/213; 345/209; 345/425; 345/130; 345/127; 345/116; 345/594; 345/653

(58) Field of Classification Search
USPC ............... 455/457, 566, 556.2; 345/419, 213, 345/209, 425, 130, 127, 116, 594, 653
See application file for complete search history.

(56) References Cited

U.S. PATENT DOCUMENTS

| 2004/0109031 A1* | 6/2004 | Deaton et al. ................ 345/848 |
| 2007/0097113 A1* | 5/2007 | Lee et al. ...................... 345/419 |
| 2008/0266289 A1* | 10/2008 | Park .............................. 345/419 |
| 2010/0064259 A1* | 3/2010 | Alexanderovitc et al. .... 715/852 |
| 2010/0095206 A1 | 4/2010 | Kim |

FOREIGN PATENT DOCUMENTS

| CN | 1731333 A | 2/2006 |
| CN | 101267574 A | 9/2008 |
| CN | 101478605 A | 7/2009 |

* cited by examiner

*Primary Examiner* — Kwasi Karikari
(74) *Attorney, Agent, or Firm* — KED & Associates, LLP

(57) ABSTRACT

A mobile terminal and a method of displaying 3D images thereon are disclosed. A display module in a mobile terminal may include a touchscreen and a controller. The touchscreen may be configured to display a plurality of icons and to receive a touch input that sets a 3D display setting for at least one of the icons. The controller may be configured to set the 3D display setting according to a pattern of the touch input. The touch pattern may determine whether the displayed 3D image of the icon is perceived to project or recede into the touch screen and/or a magnitude of a projection or recession.

18 Claims, 35 Drawing Sheets

FIG. 9A

Projected extent setting

Touch pattern
Touch count ☑
Single/multi-touch ☐
Touch duration ☐

Projected extent setting
3D display level 1   0.5  cm
3D display level 2    1   cm

Recessed extent setting

Touch pattern
Touch count ☐
Single/multi-touch ☐
Touch duration ☑

Recessed extent setting
3D display level 1 −  0.5  cm
3D display level 2 −   1   cm

OK

MOBILE TERMINAL AND METHOD OF DISPLAYING 3D IMAGES THEREON

CROSS-REFERENCE TO RELATED APPLICATION(S)

Pursuant to 35 U.S.C. §119(a), this application claims the benefit of earlier filing date and right of priority to Korean Application Nos. 10-2010-0044366, filed in Korea on May 12, 2010, and 10-2010-0064236 filed in Korea on Jul. 5, 2010, the contents of which are hereby incorporated by reference herein in their entirety.

BACKGROUND

1. Field

A mobile terminal and a method of displaying 3D images thereon.

2. Background

Mobile terminals and methods of displaying 3D images thereon are known. However, they suffer from various disadvantages.

BRIEF DESCRIPTION OF THE DRAWINGS

The embodiments will be described in detail with reference to the following drawings in which like reference numerals refer to like elements wherein:

FIG. 9A and FIG. 9B are diagrams of screen configurations for setting a projected or recessed extent of a 3D display level per touch pattern;

DETAILED DESCRIPTION

Figure 1:
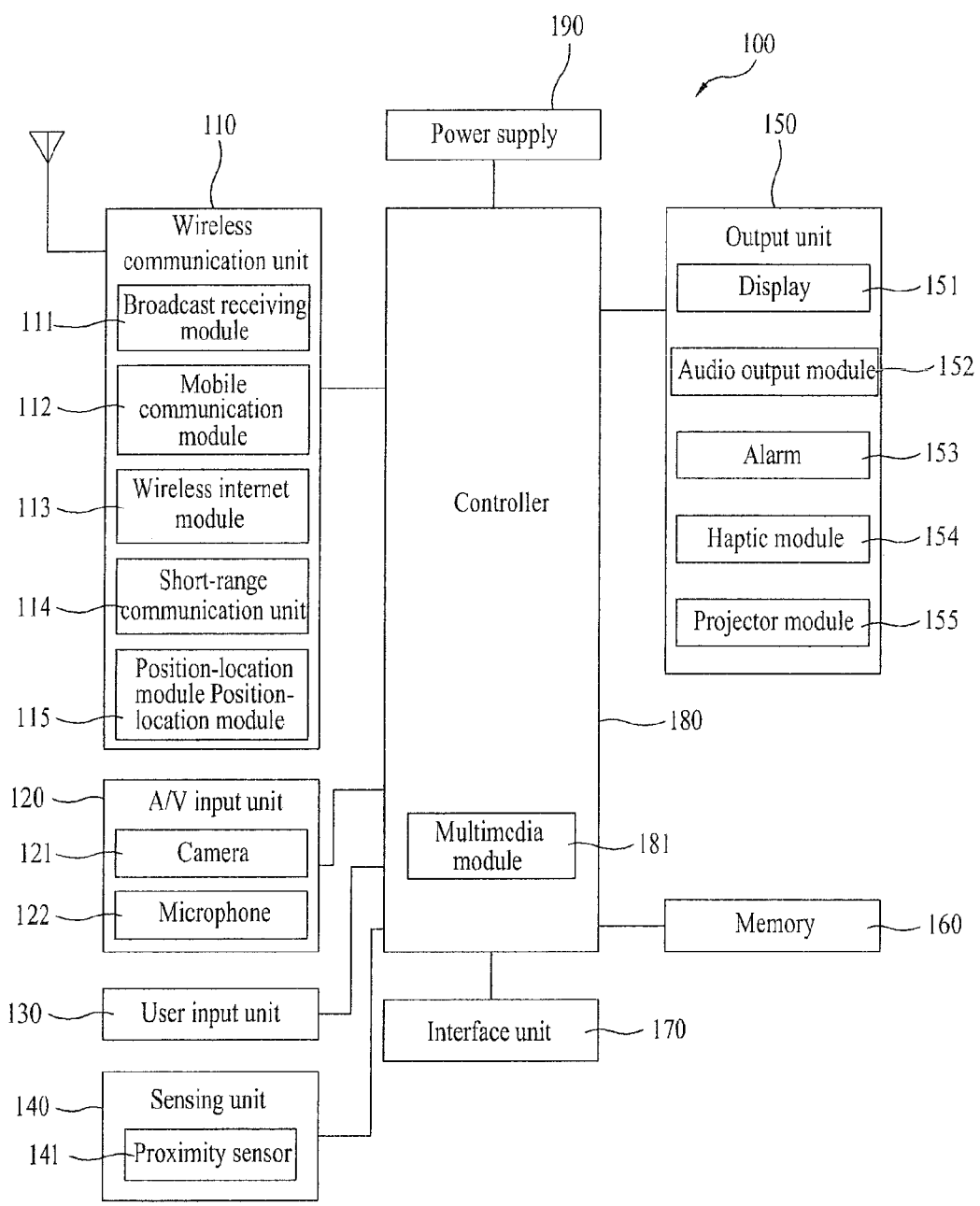
FIG. 1 is a block diagram of a mobile terminal according to one embodiment.

The present application or patent relates to a mobile terminal, and more particularly, to a mobile terminal and object icon displaying method therein. Although the mobile terminal and method as broadly disclosed herein may be suitable for a wide scope of applications, it is particularly suitable for displaying a plurality of object icons 3-dimensionally.

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

A mobile terminal may display a plurality of object icons on a screen and may be able to display each of a plurality of the object icons 3-dimensionally. Examples of mobile terminals and methods for generating and displaying 3D images thereon are disclosed in U.S. patent application Ser. Nos. 12/906,751 and 12/949,570, which are hereby incorporated by reference in their entirety. In the present application or patent, a mobile terminal and a method of controlling a 3D image are embodied and broadly disclosed, wherein a display setting for a 3D image may be set to adjust an extent to which the 3D image is perceived to protrude or recede into a display screen.

In the following detailed description, reference is made to the accompanying drawing figures which form a part hereof, and which show by way of illustration specific embodiments. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

FIG. 1 is a block diagram of a mobile terminal according to one embodiment.

Referring to FIG. 1, a mobile terminal 100 according to one embodiment includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
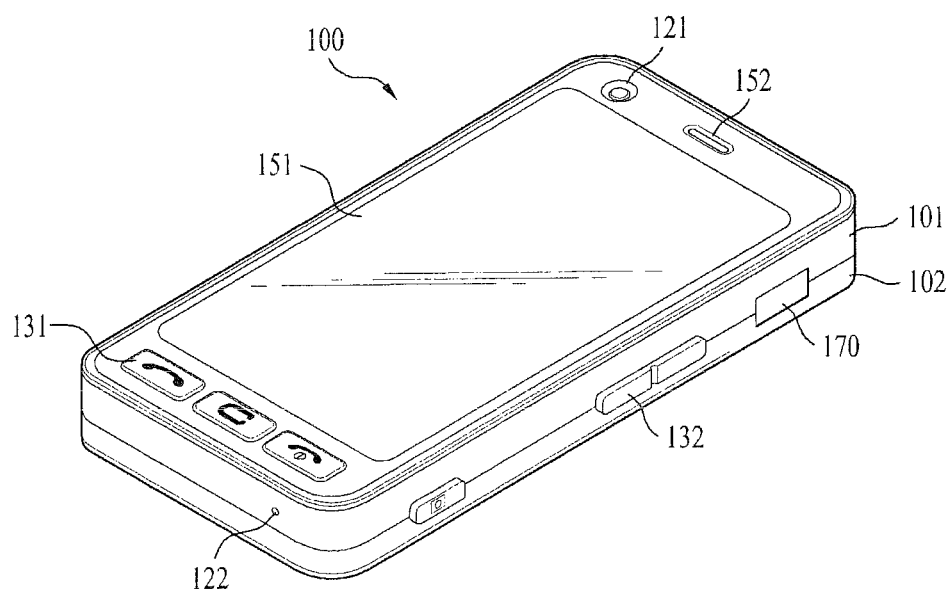
FIG. 2A is a front perspective diagram of a mobile terminal according to one embodiment.

FIG. 2A is a front perspective diagram of a mobile terminal according to one embodiment.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
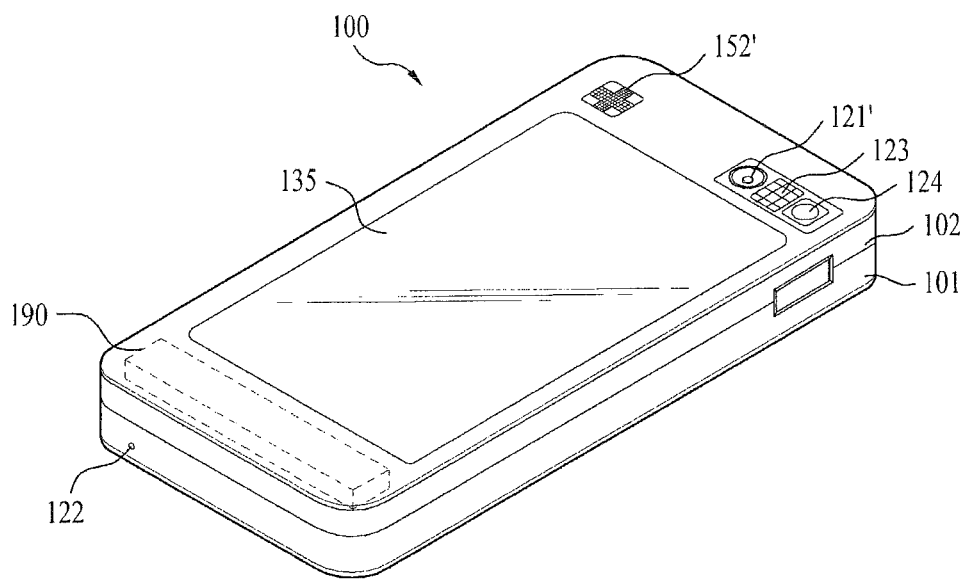
FIG. 2B is a rear perspective diagram of a mobile terminal according to one embodiment.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 are explained with reference to FIG. 3 as follows.

Figure 3:
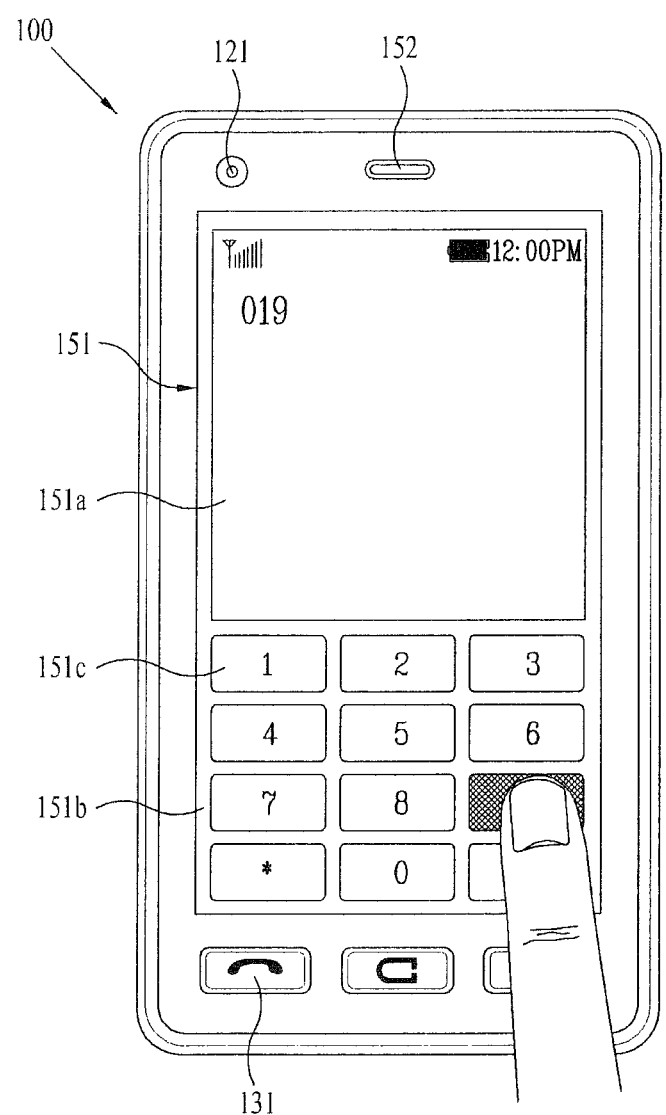
FIG. 3 is front diagram of a mobile terminal according to one embodiment for explaining one operational status of the mobile terminal.

FIG. 3 is front-view diagram of a terminal according to one embodiment for explaining an operational state thereof.

First of all, various kinds of visual information can be displayed on the display unit 151. And, this information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

First of all, a mobile terminal mentioned in the following description can include at least one of the components shown in FIG. 1.

Specifically, a display unit of this disclosure is able to perform a 3D display and can include a touchscreen for receiving an input of a touch action from a user.

For instance, a 3D display can mean that a user can see a corresponding image stereoscopically by providing different images to both eyes of a user. Moreover, the display unit 3-dimensionally displays an image currently displayed on a screen or is able to 3-dimensionally display a specific one of a plurality of objects included in an image displayed on a screen.

An object icon mentioned in this disclosure includes at least one individual image included in an image displayed on a screen and can include a menu icon, a photo image of a thumbnail type and the like for example.

In the following description, a method of displaying an object icon is explained with reference to the accompanying drawings.

Figure 4:
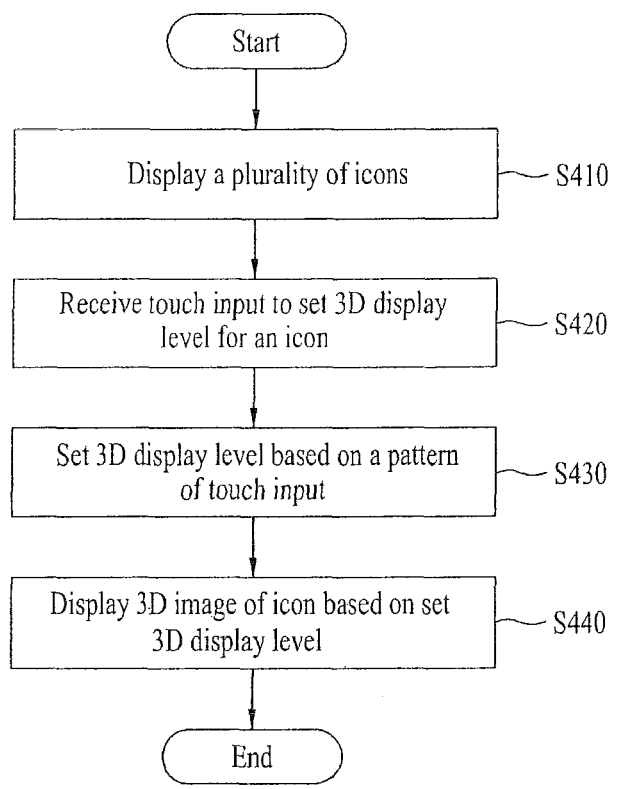
FIG. 4 is a flowchart of a method of displaying object icons in a mobile terminal according to one embodiment.

FIG. 4 is a flowchart of a method of displaying object icons in a mobile terminal according to one embodiment.

Referring to FIG. 4, the mobile terminal 100 displays a plurality of object icons on the touchscreen, in step S410.

Particularly, the displaying step S410 can be performed if a mode for setting a 3D display level of an object icon is entered. Moreover, the mobile terminal is able to switch an object icon simple display mode to the mode for setting a 3D display level of the object icon, and vice versa.

In this case, the 3D display level may refer to an extent to which the object icon is perceived to be projected or recessed in displaying each of a plurality of object icons in 3D. For instance, a specific object icon can be displayed in a manner of being projected or recessed in a predetermined distance according to a corresponding 3D display level.

For instance, the mode for the 3D display level setting can be entered if one of a selection of a corresponding menu item, a selection of a corresponding key zone or a key and a corresponding terminal motion (e.g., shaking once, inclination at a predetermined angle in a predetermined direction, etc.) is detected.

If the mode for the 3D display level setting of the object icon is entered, the mobile terminal 100 is able to display a plurality of the object icons to be distinguished from a simple display of the object icon in a manner that each of the object icons is made to vibrate.

In case that the object icon includes a menu item icon, the mobile terminal displays identifiable information (e.g., name, identifiable image, etc.) of the corresponding menu icon on the object icon. If the object icon includes a photo of a thumbnail type, the mobile terminal 100 is able to display the corresponding photo on the object icon.

In the displaying step S410, if a 3D display level previously designated to a prescribed one of a plurality of the object icons exists, the mobile terminal 100 is able to display the prescribed object icon according to a 3D display level previously designated to the corresponding object icon.

In the following description, a menu item for entering a setting mode of a 3D display level is explained with reference to FIG. 5A and FIG. 5B.

Figure 5A:
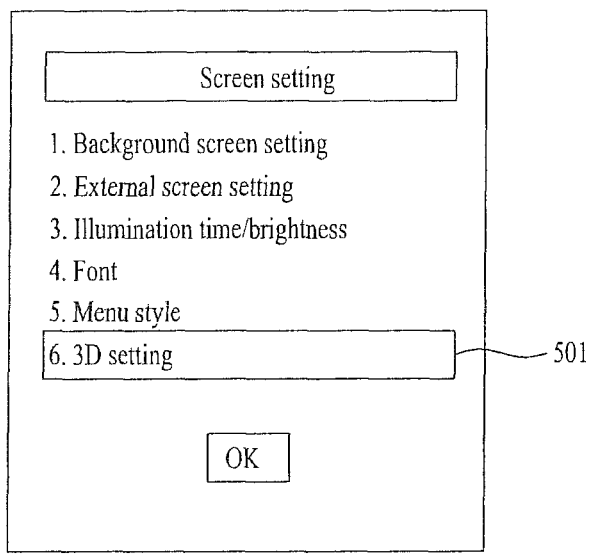
FIG. 5A and FIG. 5B are diagrams of screen configurations for displaying a menu item related to a setting of a 3D display level.
Figure 5B:
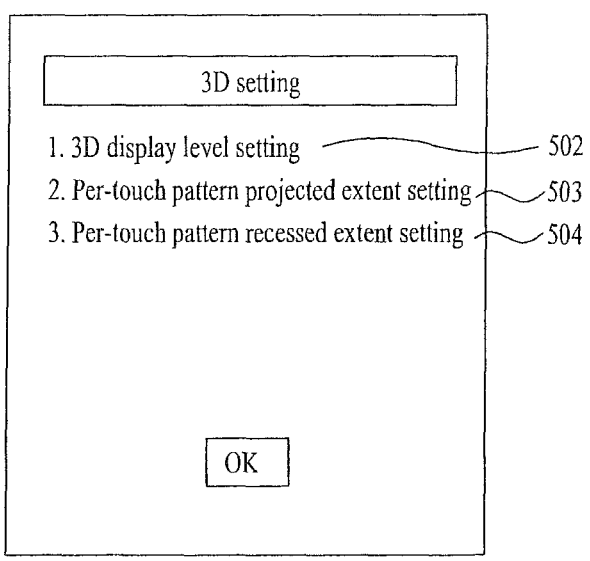

FIG. 5A and FIG. 5B are diagrams of screen configurations for displaying a menu item related to a setting of a 3D display level.

Referring to FIG. 5A, the mobile terminal 100 is able to display a menu list including a plurality of menu items as a menu search is performed. And, a menu item (3D setting) 501 related to a 3D display level setting of an object icon can be included in the displayed menu list.

Referring to FIG. 5B, if the menu item of the 3D menu setting 501 is selected in FIG. 5A, the mobile terminal 100 is able to display a menu list including menu items related to the 3D display level setting of the object icon.

For instance, the displayed menu list shown in FIG. 5B can include a menu item 502 for entering a setting mode of a 3D display level, a menu item 503 for setting a projected extent of a 3D display level per touch pattern and a menu item 504 for setting a recessed extent of a 3D display level per touch pattern.

Referring now to FIG. 4, the mobile terminal 100 receives an input of a touch action for setting a 3D display level of a specific one of a plurality of the displayed object icons via the touchscreen, in step S420.

For instance, the touch action can include one of a single touch, a multi-touch, a predetermined count of touches, a touch for predetermined duration, a touch & drag in a predetermined shape, a proximity touch and the like.

Moreover, a touch pattern of a touch action can vary according to a 3D display level to set. For instance, if a projected or recessed extent of a 3D display level to set increases, the touch count is incremented or a touch duration can be elongated.

Furthermore, a touch action can vary according to whether an object icon will be displayed by being projected or recessed. For instance, in case of attempting to project and display an object icon, a touch action (e.g., a single touch) can be inputted using one pointer. In case of attempting to recess and display an object icon, it is able to input a touch action (e.g., a multi-touch) using a plurality of pointers.

Afterwards, the mobile terminal 100 sets the 3D display level of the specific object icon according to the touch pattern of the inputted touch action under the control of the controller 180.

A first 3D display level mentioned in the following description may be a level having a projected (or recessed) extent of a corresponding object icon set to d1. And, a second 3D display level may mean a level having a projected (or recessed) extent of a corresponding object icon set to d2 (>d1).

For example, if an icon is set to a first 3D display level, a display of the first icon may be perceived to protrude or recede by a first distance d1 to provide the 3D graphic effect (e.g., to appear as being projected towards or recessed away by a distance d1 when viewing the display). Moreover, a second 3D display level may correspond to a second distance d2 which may be greater than d1. Hence, an icon having the second 3D display level may be perceived to be projected out from or recessed into the display by a greater amount.

In the following description, a touch action for setting a first or second 3D display level for a specific object icon is explained.

For instance, if a touch action includes a single touch, the first 3D display level is set. If a touch action includes a multi-touch, the second 3D display level can be set. If a touch action includes a touch-once, a first 3D display level is set. If a touch count is 2, a second 3D display level can be set. If a touch duration is a first duration, a first 3D display level is set. If a touch duration is a second duration (>first duration), a second 3D display level can be set. If a touch action includes a touch & drag action for drawing a numeral '1', a first 3D display level is set. If a touch action includes a touch & drag action for drawing a numeral '2', a second 3D display level can be set. If a terminal is shaken once, a first 3D display level is set. If a terminal is shaken twice, a second 3D display level can be set.

In the following description, a touch action for sequentially setting a first 3D display level and a second 3D display level for a specific object icon is explained.

First of all, for example, if a touch action includes a single touch (or a multi-touch), a first 3D display level is set. While the first 3D display level is set, if a single touch (or a multi-touch) is re-inputted, a second 3D display level can be set. If a touch action for a first duration is inputted, a first 3D display level is set. While the first 3D display level is set, if a touch action for the first duration is re-inputted, a second 3D display level can be set. If a touch action includes a touch & drag action for drawing a figure '1', a first 3D display level is set. While the first 3D display level is set, if a touch & drag action for drawing a figure '2' is inputted, a second 3D display level can be set. If a terminal is shaken once, a first 3D display level is set. While the first 3D display level is set, if the terminal is further shaken one more time, a second 3D display level can be set.

If the specific object icon is being displayed by being projected or recessed according to the 3D display level set for the specific object icon in the displaying step S410, the mobile terminal 100 is able to determine a projected or recessed extent of the specific object icon in consideration of the 3D display level set in the setting step S430 for a currently projected or recessed distance.

For instance, while a specific object icon is currently displayed by being projected by d3, if a touch action for setting a first 3D display level (projected extent: d1) is inputted, a projected extent of the specific object icon can be determined as d3+d1. If a specific object icon is being displayed by being recessed by d3, a projected extent (d1>d3) or a recessed extent (d1<d3) of the specific object icon can be determined as d1-d3.

Meanwhile, assume that a projected display is performed by 2 steps. And, assume that a recessed display can be performed by 2 steps. First to fourth 3D display levels are configured. In this case, the first 3D display level means a recessed display by d2. The second 3D display level means a recessed display by d1. The third 3D display level means a projected display by d1. And, the fourth 3D display level means a projected display by d2.

For instance, a sequential setting of the first to fourth 3D display levels is explained as follows. First of all, if a touch count keeps being incremented by 1 each time, the first to fourth 3D display levels can be sequentially set. An individual setting of the first to fourth 3D display levels is explained as follows. First of all, if a touch count is 1, the first 3D display level is set. If a touch count is 2, the second 3D display level is set. If a touch count is 3, the third 3D display level is set. If a touch count is 4, the fourth 3D display level is set.

The mobile terminal 100 3-dimensionally displays the specific object icon to be projected or recessed based on to the 3D display level set in the setting step S430 using the touchscreen under the control of the controller 180, in step S440.

A setting of a 3D display level under the control of the controller 180 and a display of an object icon according to the setting are explained in detail with reference to the accompanying drawings as follows.

Figure 6A:
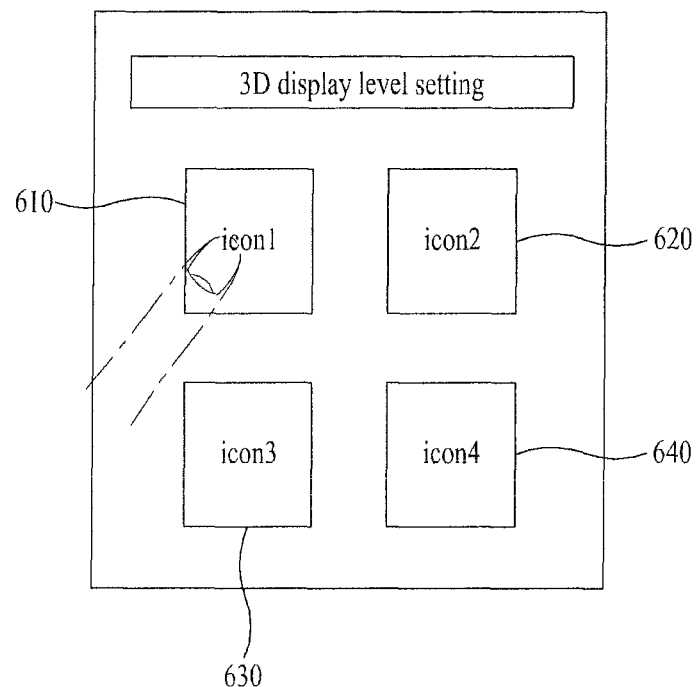
FIGS. 6A to 6C are diagrams of screen configurations for setting a 3D display level to project and display an object icon.
Figure 6B:
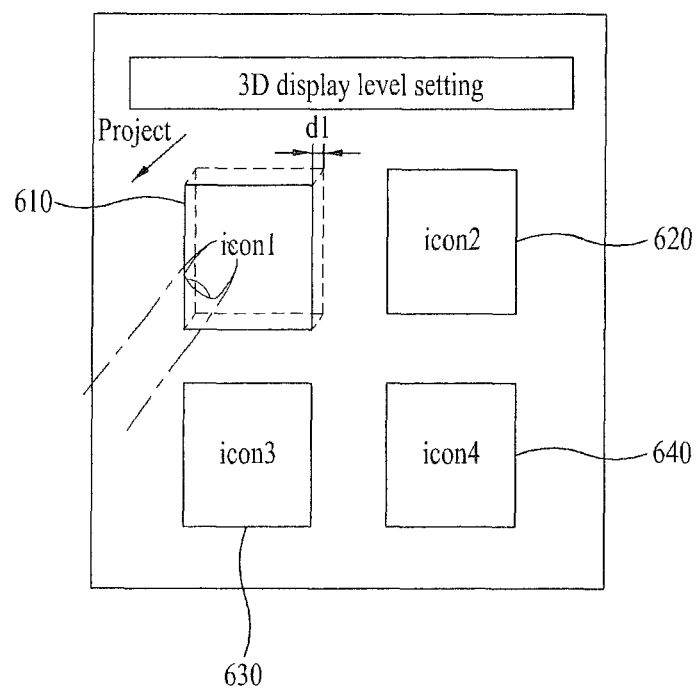
Figure 6C:
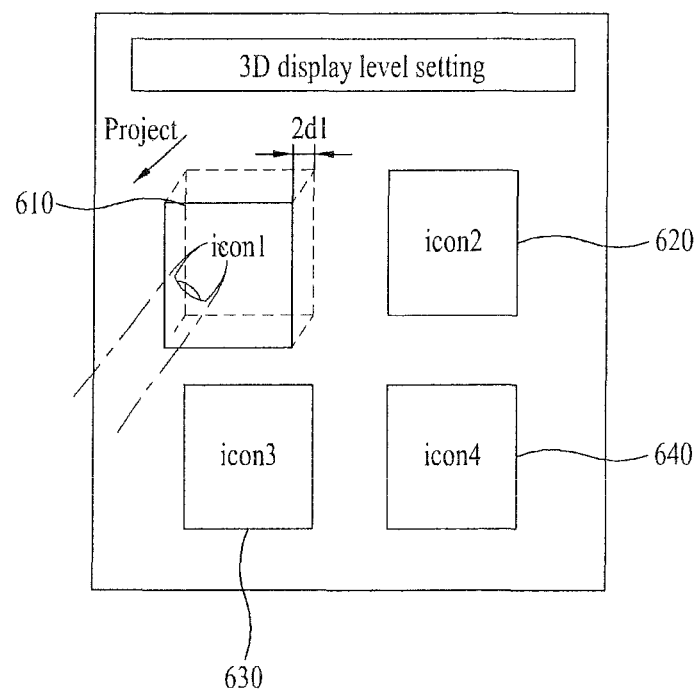
Figure 7A:
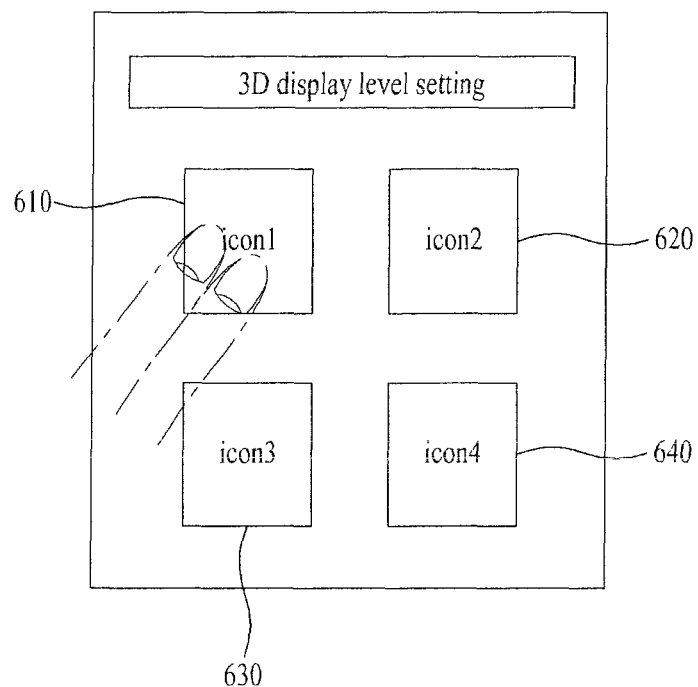
FIGS. 7A to 7C are diagrams of screen configurations for setting a 3D display level to recess and display an object icon.
Figure 7B:
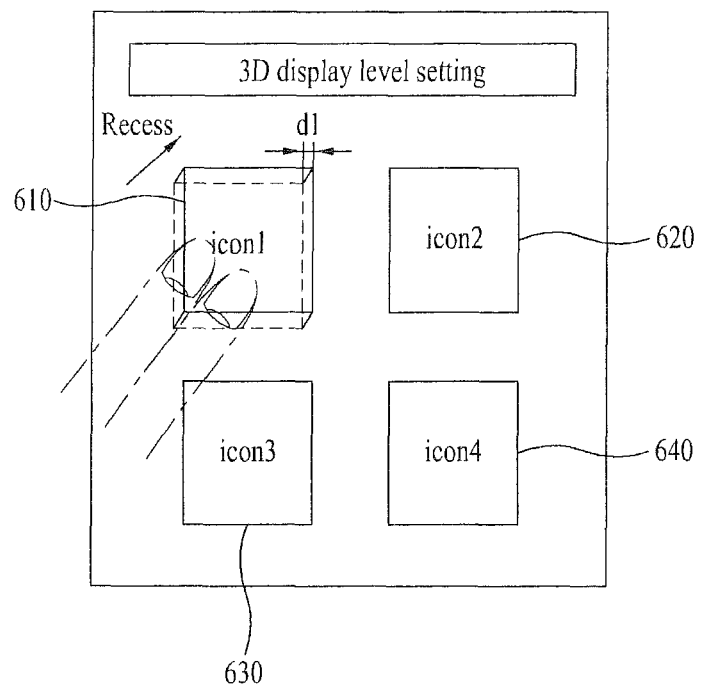
Figure 7C:
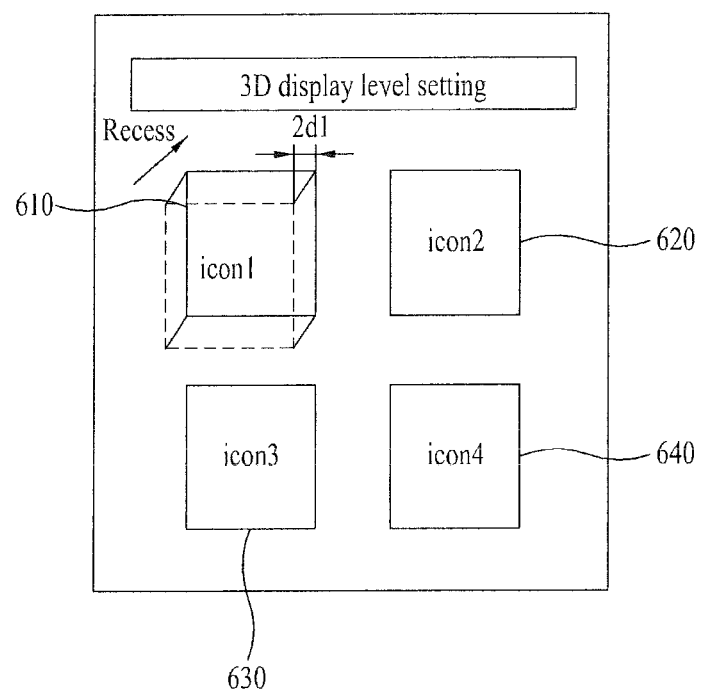

FIGS. 6A to 6C are diagrams of screen configurations for setting a 3D display level to project and display an object icon, and FIGS. 7A to 7C are diagrams of screen configurations for setting a 3D display level to recess and display an object icon. As the menu item 502 is selected in FIG. 5B, assume a case that the setting mode under the control of the controller 180 is entered.

Referring to FIGS. 6A to 7C, the mobile terminal 100 displays first to fourth object icons 610 to 640 on the touchscreen and is able to set a 3D display level for each of the first to fourth object icons 610 to 640.

In the following description, a case of setting the 3D display level for the first object icon 610 among the first to fourth object icons 610 to 640 is representatively explained with reference to FIGS. 6A to 6C for example.

Referring to FIG. 6A and FIG. 6B, in case of receiving a single touch to the first object icon 610 once, as shown in FIG. 6A, the mobile terminal 100 sets a first 3D display level for the first object icon 610 and is able to display the first object icon 610 in a manner of projecting the first object icon 610 by d1, as shown in FIG. 6B.

Referring to FIG. 6B and FIG. 6C, in case of receiving a single touch to the first object icon 610 in FIG. 6B once again, as shown in FIG. 6B, the mobile terminal 100 sets a second 3D display level for the first object icon 610 and is able to display the first object icon 610 in a manner of projecting the first object icon 610 by 2d1, as shown in FIG. 6C. Here, 2d1 may be twice the distance of d1

For example, if a single touch input corresponds to a 3D display setting d1 of 1 cm, a second single touch input at the icon may set the 3D display setting at 2d1, or 2 cm. In other words, the change caused by consecutive single touch inputs may be cumulative.

In certain embodiments, the second touch input may replace or override the previously stored 3D display level setting. For example, if a first touch input corresponds to a 3D display level setting such that the first icon 610 is displayed to protrude by 1 cm, and the second the second touch input corresponds to a 3D display level setting such that the first icon 610 is displayed to protrude by 2 cm, in response to the second touch input, the first icon 610 may be displayed according to the second touch input, e.g., to appear to protrude from the touchscreen display by 2 cm.

The following description is made with reference to FIGS. 7A to 7C.

Referring to FIG. 7A and FIG. 7B, in case of receiving a multi-touch to the first object icon 610 once, as shown in FIG. 7A, the mobile terminal 100 sets a first 3D display level for the first object icon 610 and is able to display the first object icon 610 in a manner of recessing the first object icon 610 by d1, as shown in FIG. 7C.

Referring to FIG. 7B and FIG. 7C, in case of receiving a multi-touch to the first object icon 610 in FIG. 7B once again, as shown in FIG. 7B the mobile terminal 100 sets a second 3D display level for the first object icon 610 and is able to display the first object icon 610 in a manner of recessing the first object icon 610 by 2d1, as shown in FIG. 7C.

Moreover, referring to FIG. 7A and FIG. 7C, in case of receiving a multi-touch to the first object icon 610 twice consecutively, as shown in FIG. 7C, the mobile terminal 100 sets a second 3D display level for the first object icon 610 and is able to display the first object icon 610 in a manner of recessing the first object icon 610 by 2*d*1, as shown in FIG. 7C. Here, 2d1 may be twice the distance of d1.

For example, if a single touch input corresponds to a 3D display setting d1 of −1 cm, a second single touch input at the icon may set the 3D display setting at 2d1, or −2 cm. In other words, the change caused by consecutive single touch inputs may be cumulative.

In certain embodiments, the second touch input may replace or override the previously stored 3D display level setting. For example, if a first touch input sets the 3D display level setting such that the first icon 610 is displayed to recede into the display by −1 cm, and the second the second touch input sets the 3D display level setting such that the first icon 610 is displayed to recede by −2 cm, in response to the second touch input, the first icon 610 may be displayed according to the second touch input, e.g., to appear to be recessed into the touchscreen display by −2 cm.

As mentioned in the above description, a touch action for commanding a recessed display is different from a touch action for commanding a projected display. And, a touch action thereof can differ according to a projected or recessed extent indicated by a 3D display level.

Moreover, a first or second 3D display level in a projected/recessed display may have the same distance extent indicating a projected or recessed extent. In particular, a first/second 3D display level in a projected display is named a first/second projected display level. A first/second 3D display level in a recessed display can be named a first/second recessed display level.

Figure 8A:
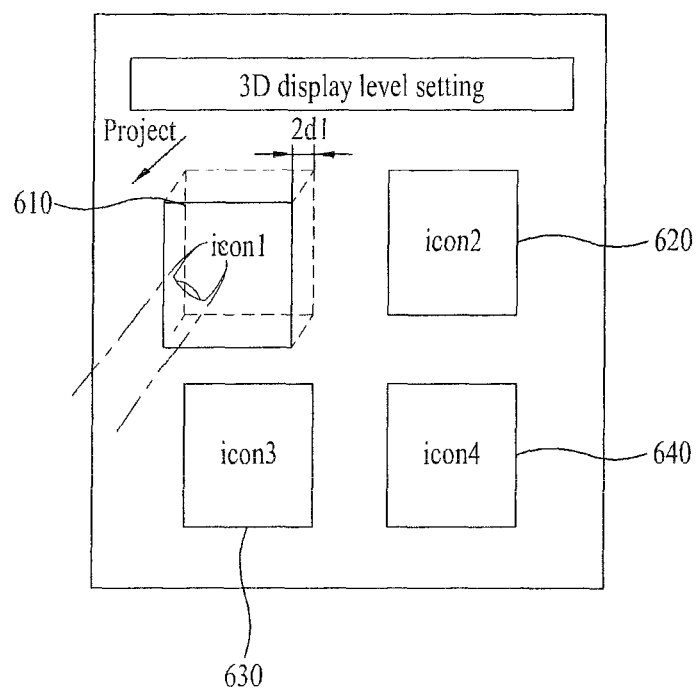
FIGS. 8A to 8C are diagrams of screen configurations for returning a projected or recessed displayed object icon to an original state.
Figure 8B:
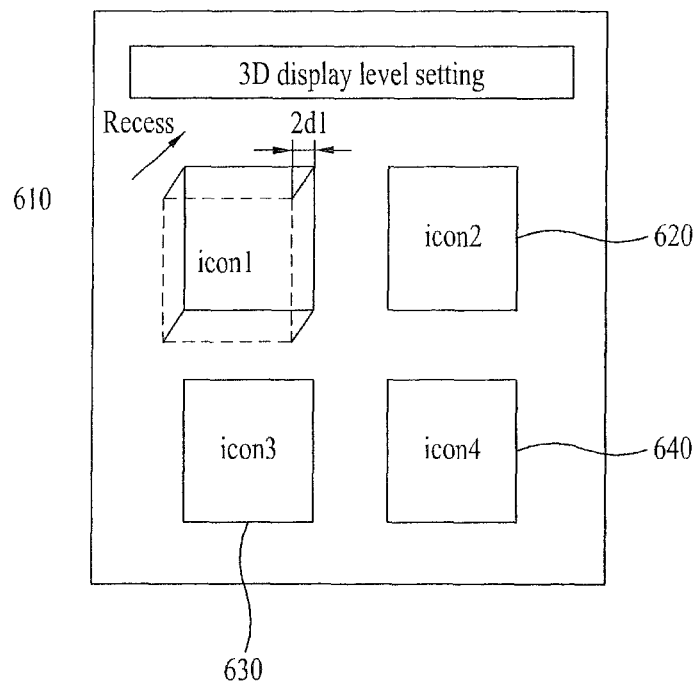
Figure 8C:
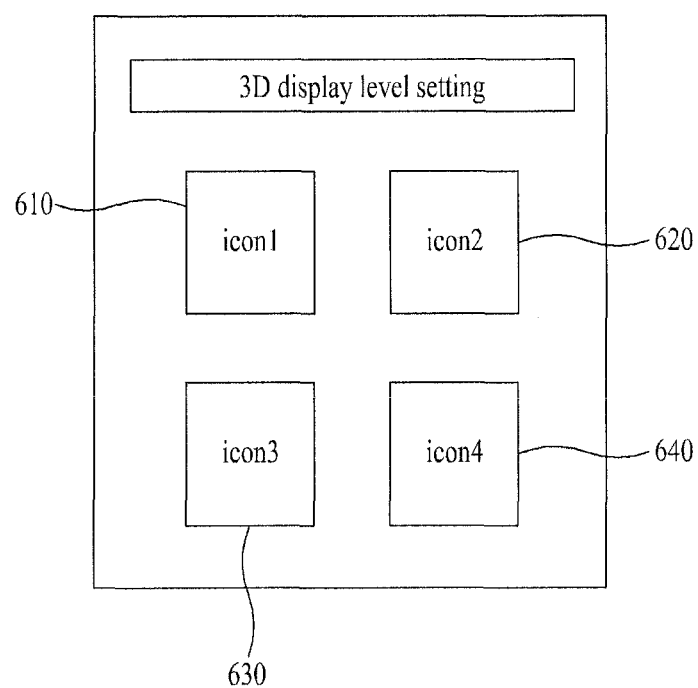

FIGS. 8A to 8C are diagrams of screen configurations for returning a projected or recessed displayed object icon to an original state.

Referring to FIG. 8A and FIG. 8C, in case of receiving an input of a multi-touch once to the first object icon 610, which is being displayed by being projected in the state shown in FIG. 6C, the mobile terminal 100 sets a first 3D display level for the first object icon 610 and displays the first object icon 610 in a manner of projecting the first object icon 610 by d1. In case of receiving an input of the multi-touch once again, the mobile terminal 100 is able to display the first icon 610 2-dimensionally.

Alternatively, in case of receiving a multi-touch to the first object icon 610 twice consecutively in FIG. 8A, the mobile terminal 100 is able to 2-dimensionally display the first object icon 610, as shown in FIG. 8C.

Alternatively, in case of receiving an input of a multi-touch to the first object icon 610 once in FIG. 8A, the mobile terminal 100 is able to 2-dimensionally display the first object icon 610 directly without performing the first 3D display level setting process, as shown in FIG. 8C.

Referring to FIG. 8B and FIG. 8C, in case of receiving an input of a touch maintaining action for a first duration on the first object icon 610 that is being displayed by being recessed in the state shown in FIG. 7C, the mobile terminal 100 sets a first 3D display level for the first object icon 610 and displays the first object icon 610 in a manner of recessing the first object icon 610 by d1. In case of receiving an input of the touch maintaining action for the first duration again, the mobile terminal 100 is able to display the first object icon 610 2-dimensionally. In this case, the first duration can be set by a user in advance.

Alternatively, in case of receiving an input of a touch maintaining action for a second duration on the first object icon 610 in FIG. 8B, the mobile terminal 100 is able to display the first object icon 610 2-dimensionally (FIG. 8C). In this case, the second duration may be duration which may be longer than the first duration or can be set by a user in advance.

Alternatively, in case of receiving an input of a touch maintaining action for the first duration on the first object icon 610 once in FIG. 8B, the mobile terminal 100 is able to 2-dimensionally display the first object icon 610 directly without performing the first 3D display level setting process (FIG. 8C).

As mentioned in the above description, a touch action for setting a 3D display level for a specific object icon may be different from a touch action for returning a 3-dimensionally displayed specific object icon to a 2D display according to a 3D display level.

FIG. 9A and FIG. 9B are diagrams of screen configurations for setting a projected or recessed extent of a 3D display level per touch pattern. Assume a case that the menu item 503 or the menu item 504 is selected in FIG. 5B.

Referring to FIG. 9A, if the menu item 503 is selected in FIG. 5B, the mobile terminal 100 is able to display a first region for receiving a selection of a touch pattern of a touch action for commanding a 3D display level setting from a user and a second region for receiving an input of a per-3D display level projected extent from the user.

For instance, a user selects a touch count as a touch pattern from the first region and is able to input 0.5 cm as a projected extent of a first 3D display level and 1 cm as a projected extent of a second 3D display level to the second region.

Therefore, the mobile terminal 100 is able to set the 3D display level according to the touch count (e.g., touch-once_first 3D display level, touch-twice_second 3D display level) and is able to set the projected extents of the first and second 3D display levels to 0.5 cm and 1 cm, respectively.

Referring to FIG. 9B, if the menu item 504 is selected in FIG. 5B, the mobile terminal 100 is able to display a first region for receiving a selection of a touch pattern of a touch action for commanding a 3D display level setting from a user and a second region for receiving an input of a per-3D display level recessed extent from the user.

For instance, a user selects a touch duration as a touch pattern from the first region and is able to input −0.5 cm as a recessed extent of a first 3D display level and −1 cm as a recessed extent of a second 3D display level to the second region.

Therefore, the mobile terminal 100 is able to set the 3D display level according to the touch duration (e.g., touch for 1 second to set first 3D display level, touch for 2 seconds to set second 3D display level) and is able to set the recessed extents of the first and second 3D display levels to −0.5 cm and −1 cm, respectively.

Referring now to FIG. 4, the mobile terminal 100 is able to display information of each of the 3D display levels on the projected/recessed displayed object icon in the displaying step S440 under the control of the controller 180. For instance, information on the first 3D display level can be displayed on the object icon in a manner that is different than information of the second 3D display level.

This is explained in detail with reference to FIGS. 10A to 10C as follows.

FIGS. 10A to 10E are diagrams of screen configurations for displaying different information on an object icon in accordance with a 3D display level.

Figure 10A:
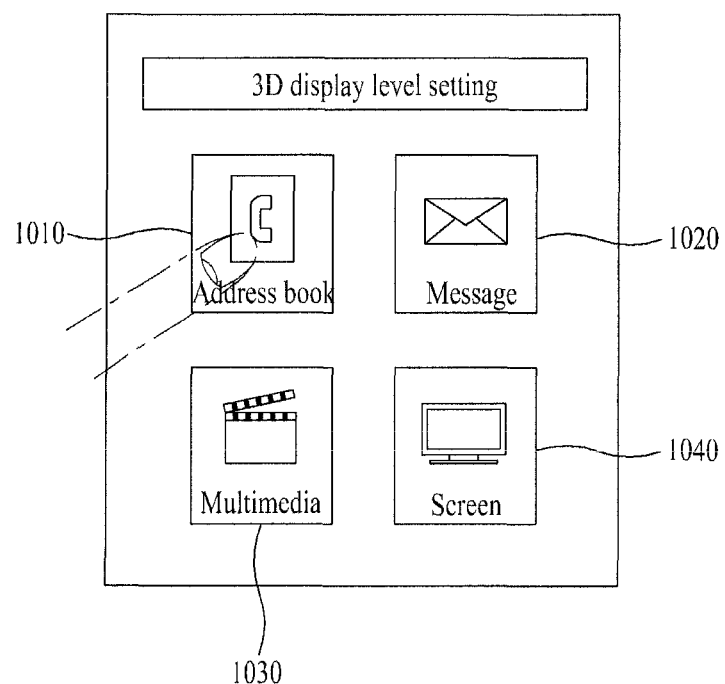
FIGS. 10A to 10E are diagrams of screen configurations for displaying different information on an object icon in accordance with a 3D display level.
Figure 10B:
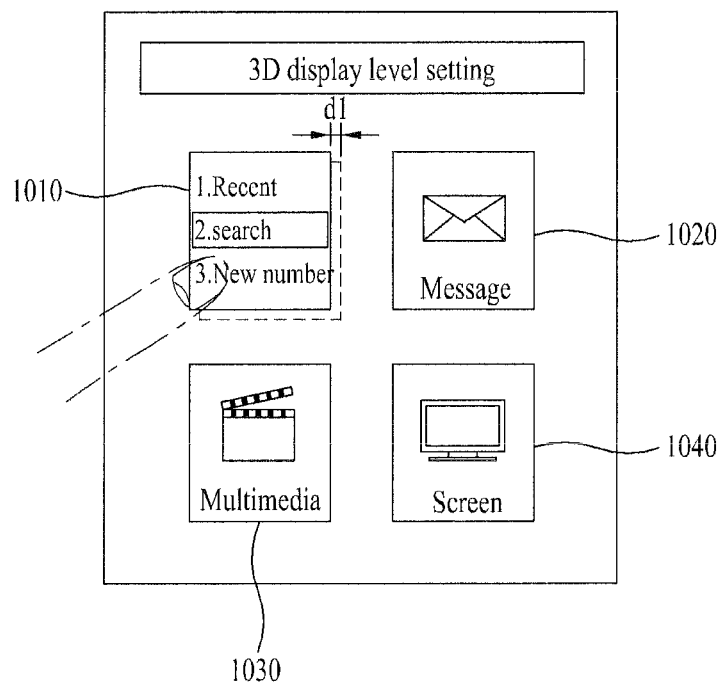
Figure 10C:
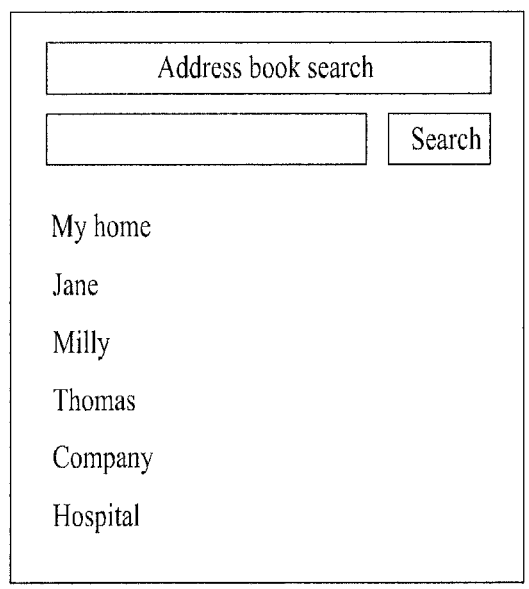

Referring to FIGS. 10A to 10C, in a mode for a 3D display level setting of an object icon, the mobile terminal 100 is able to display such an object icon indicating a menu icon as an address book icon 1010, a message icon 1020, a multimedia icon 1030, a screen icon 1040 and the like.

For clarity and convenience, in a state that a 3D display level is not set or in a 2D display mode, assume that a representative image or name of a corresponding menu item can be displayed on an object icon (FIG. 10A).

Referring to FIGS. 10B and 10C, in case of receiving an input of a touch action once on the address book icon 1010 shown in FIG. 10A, the mobile terminal 100 sets a first 3D display level for the address book icon 1010 and is able to display an address book related menu item list (e.g., recently transceived phone numbers, an address book search, a new phone number registration and the like can be included) on the address book icon 1010.

Moreover, if the address book search is selected from the menu item list shown in FIG. 10B, the mobile terminal 100 is able to display a screen for searching phone numbers by executing an address book function, as shown in FIG. 10C.

Figure 10D:
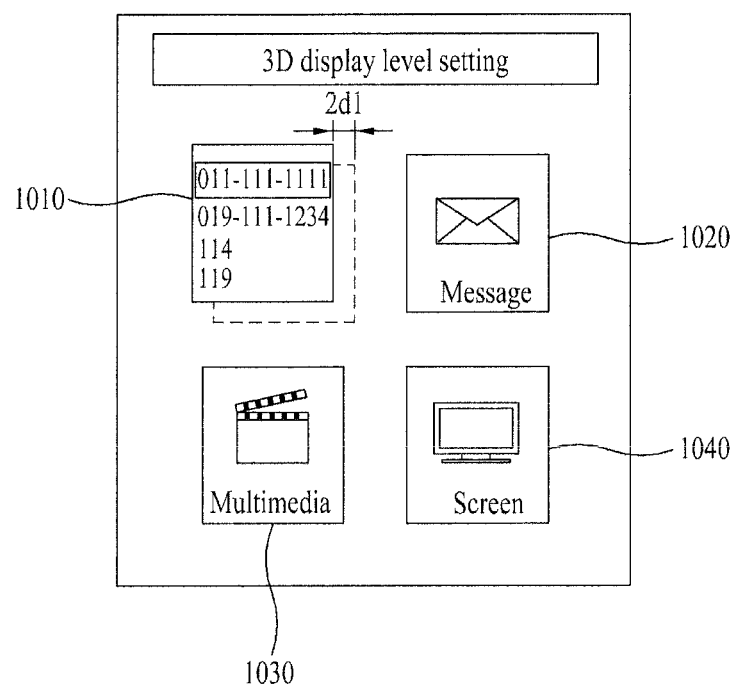
Figure 10E:
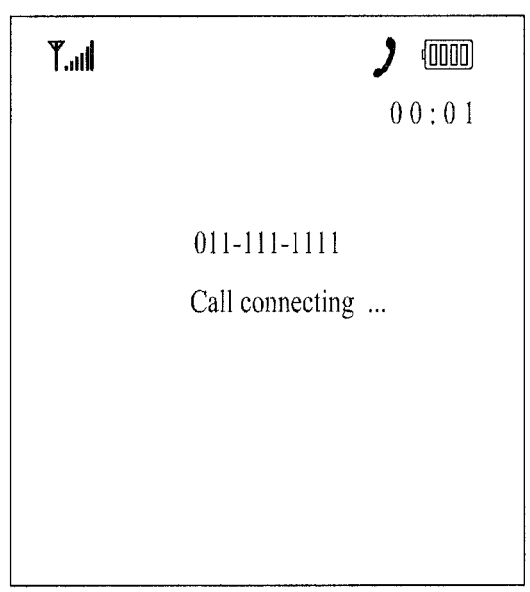

Referring to FIGS. 10D and 10E, in case of receiving an input of a touch action twice consecutively on the address book icon 1010 shown in FIG. 10A or a reinput of the touch action once on the address book icon 1010 having the first 3D display level set, as shown in FIG. 10B, the mobile terminal 100 sets a second 3D display level for the address book icon 1010 and is able to display phone numbers of counterparts, with which calls or messages have been recently transceived, on the address book icon 1010.

In other words, information according to the execution of a specific menu item (e.g., recently transceived phone numbers) in the menu item list shown in FIG. 10B can be displayed on the address book icon 1010, as shown in FIG. 10D.

Moreover, if a specific phone number is selected from the phone numbers shown in the address book icon 1010 in FIG. 10D, the mobile terminal 100 is able to send a call signal to a counterpart corresponding to the selected specific phone number, as shown in FIG. 10E.

As mentioned in the foregoing description, after a setting process of a 3D display level for an object icon has been completed, if a mode for displaying the object icon is entered, the corresponding object icon can be 3-dimensionally displayed in a manner of being projected or recessed according to the 3D display level set in the setting process.

While a specific object icon to set a 3D display level is specified, in case that a prescribed key provided to the mobile terminal 100 is being pressed for a predetermined duration, the mobile terminal 100 continuously displays the specific object icon in a manner of projecting or recessing the specific object icon. If the prescribed key is released from being pressed, the mobile terminal 100 is able to set the 3D display level corresponding to a projected or recessed extent on the release for the specific object icon.

Figure 11:
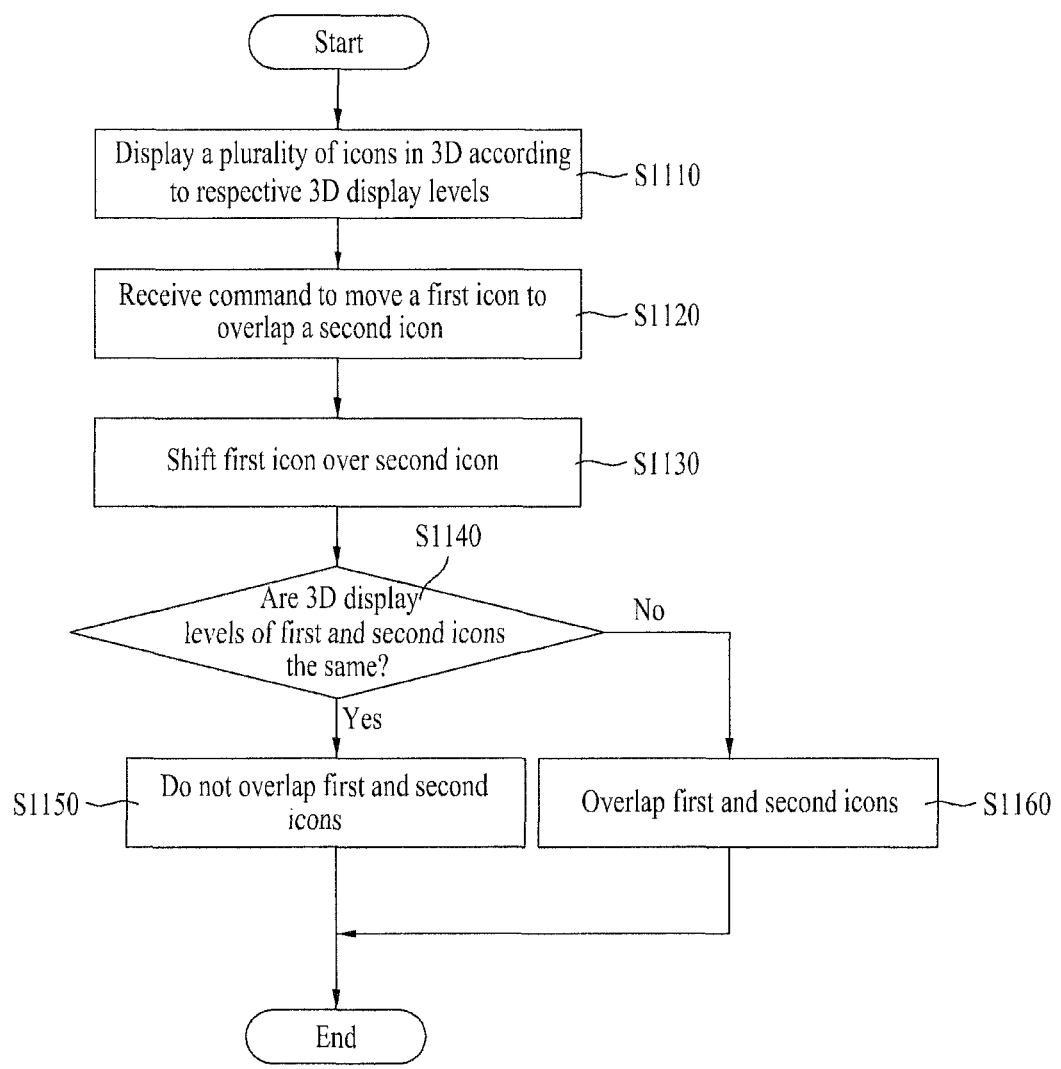
FIG. 11 is a second flowchart of a method of displaying an object icon in a mobile terminal according to one embodiment.

FIG. 11 is a flowchart of a method of displaying an object icon in a mobile terminal according to one embodiment.

Referring to FIG. 11, the mobile terminal 100 3-dimensionally displays a plurality of object icons to correspond to 3D display levels respectively set for a plurality of the object icons using the touchscreen, under the control of the controller 180, in step S110.

The setting of the 3D display level for the object icon can refer to the former description with reference to FIGS. 4 to 10E and its details shall be omitted from the following description.

Some of a plurality of the displayed object icons may have the same 3D display level, while the rest may have 3D display levels different from one another. Each of the object icons having the same 3D display level set is 3-dimensionally displayed to the same projected or recessed extent. And, the rest of the object icons having the different 3D display levels set respectively can be 3-dimensionally displayed to the projected or recessed extents different from one another.

The mobile terminal 100 receives an input of a touch action for shifting a first one of a plurality of the displayed object icons via the touchscreen, in step S1120.

For instance, the touch action for shifting the first object icon can include a touch & drag action from one point of the first object icon to another point within the screen.

The mobile terminal 100 shifts the first object icon to a specific point within the screen to correspond to the inputted touch action under the control of the controller 180, in step S1130.

For instance, in case that the touch action includes the touch & drag action, the first object icon can be shifted to an end point of the touch & drag action (i.e., example of the specific point).

In case that a second object icon is being displayed at the specific point to which the first object icon is shifted, the mobile terminal 100 determines whether the 3D display level of the first object icon is equal to that of the second object icon under the control of the controller 180, in step S1140.

As a result of the determination, if the 3D display level of the first object icon is equal to that of the second object icon, under the control of the controller 180, the mobile terminal 100 displays the first and second object icons not to be overlapped with each other, in step S1150.

If the 3D display levels are equal to each other, it means that the projected or recessed extents of the first and second object icons are equal to each other. Therefore, the first and second object icons are unable to be displayed in a manner of being overlapped with each other at one point (e.g., the specific point).

In order to display the first and second object icons not to be overlapped with each other, the mobile terminal 100 displays the first object icon next to the second object icon displayed at the specific point in parallel with the second object icon.

This is explained in detail with reference to FIGS. 12A to 12C as follows.

Figure 12A:
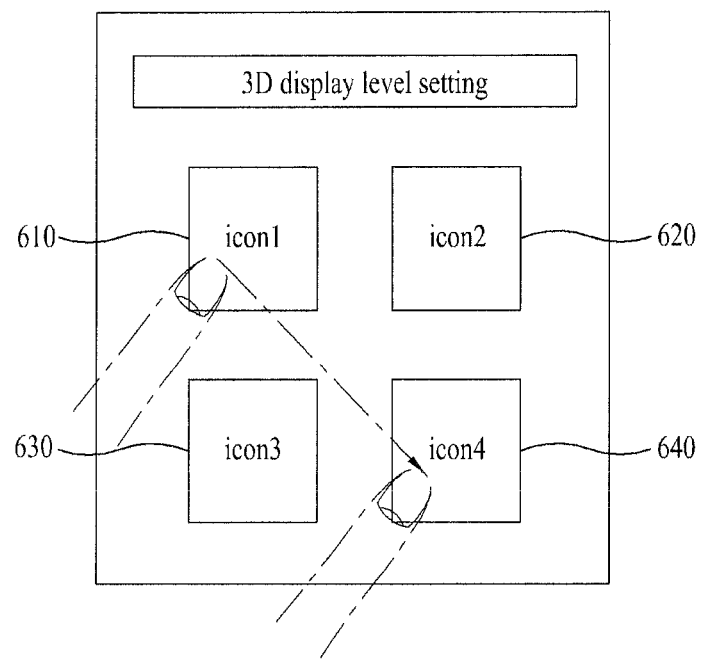
FIGS. 12A to 12D are diagrams of screen configurations in case that a 3D display level of a first object icon is equal to that of a second object icon.
Figure 12B:
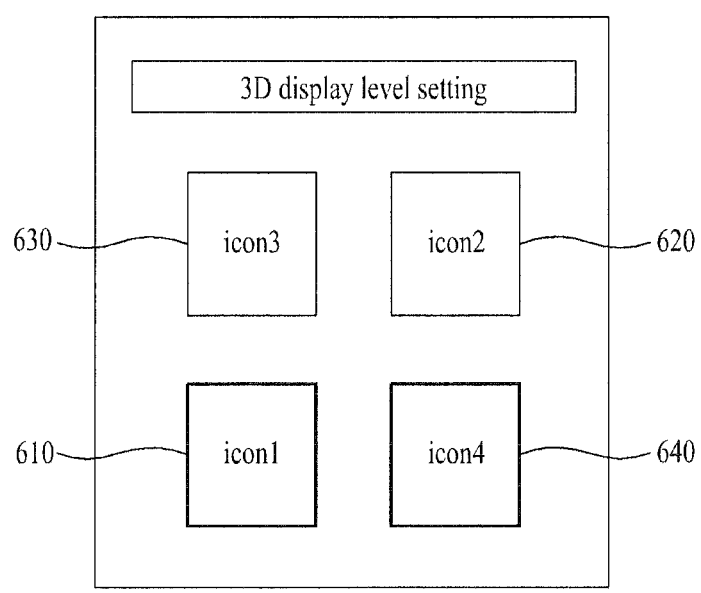
Figure 12C:
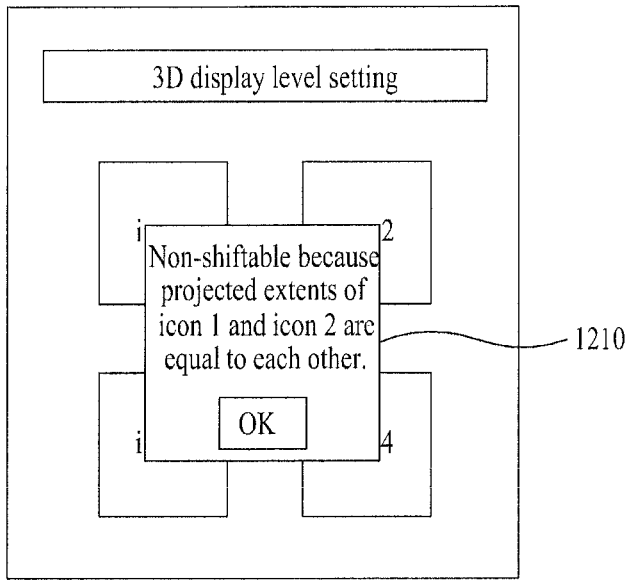

FIGS. 12A to 12C are diagrams of screen configurations in case that a 3D display level of a first object icon is equal to that of a second object icon.

Referring to FIGS. 12A to 12D, the mobile terminal 100 is able to display first to fourth object icons 610 to 640 as a plurality of object icons on the touchscreen.

Referring to FIG. 12A, the mobile terminal 100 is able to receive an input of a touch & drag action from a first point within the first object icon 610 to a second point within the fourth object icon 640 from a user. In this case, the same 3D display level is set for each of the first and fourth object icons 610 and 640.

Referring to FIG. 12B, once the touch & drag action is completed, the mobile terminal 100 is able to position the first object icon 610 in parallel with the fourth object icon 640 in a manner of shifting the first object icon 610 next to the fourth object icon 640. In doing so, the third object icon 630 used to be located in parallel next to the fourth object icon 640 can be shifted to the previous position of the first object icon 610.

Referring to FIG. 12C, if the touch & drag action is completed, the mobile terminal 100 does not shift the first object icon 610 but is able to output a text in a notification window 1210 indicating that the first object icon 610 is not shiftable to the position of the fourth object icon 640 due to the same 3D display level of the first and fourth object icons 610 and 640.

Figure 12D:
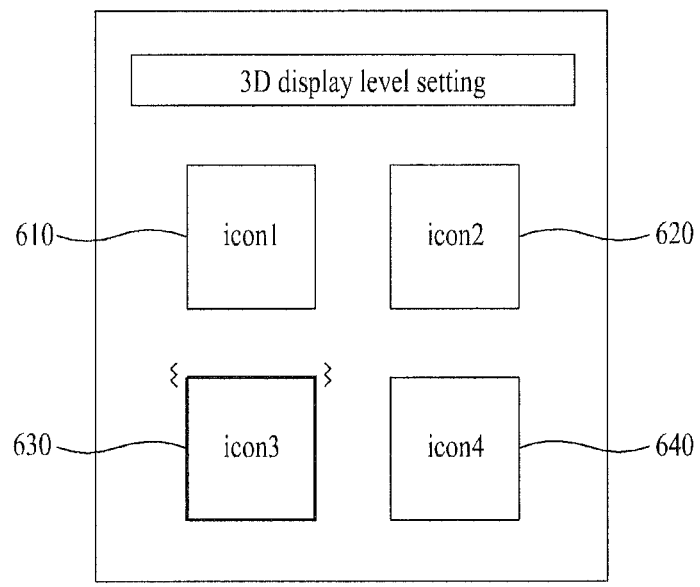

Moreover, as shown in FIG. 12D, in case that the first object icon 610 is not shiftable to the position of the fourth object icon 640 due to the same 3D display level of the first and fourth object icons 610 and 640, the mobile terminal is able to distinguishably display the third object icon 630 having the 3D display level set different from that of the first object icon 610. This is to inform a user of a shiftable position for the first object icon 610.

Referring now to FIG. 11, as a result of the determination, if the 3D display level of the first object icon is different from that of the second object icon, the mobile terminal 100 displays the first and second object icons in a manner that the first and second object icons are overlapped with each other, under the control of the controller 180, in step S1160.

The difference in the 3D display level refers to a difference in the projected or recessed extents of object icons. Hence, the first and second object icons can be displayed in a manner of being overlapped with each other at one point (e.g., the specific point).

As the first and second object icons can be displayed in a manner of being overlapped with each other, in order for a relatively recessed icon to be viewed, the first and second object icons are displayed in a manner of being partially overlapped with each other or increasing a size of the object icon located behind.

This is explained in detail with reference to FIGS. 13A to 13D as hereinafter.

In one embodiment, the 3D display levels of two icons having the same 3D display levels may be automatically changed. For example, referring to FIG. 12A, when the first icon 610 is determined to have the same 3D display level of the destination object icon, e.g., the fourth icon 640 in FIG. 12B, such that the first icon 610 may not be displayed to overlap the fourth icon 640, the 3D display level of the first icon 610 (or the fourth icon 640) may be changed. That is, the 3D display setting of the first icon 610 may be changed such that the perceived depth of the two icons are set to be different such that the two icons may be stacked. Moreover, a notification message (e.g., in a pop-up window) may be displayed to notify the user that the 3D display settings were changed. Alternatively, the notification message may include buttons to prompt the user to accept or cancel the changes to the 3D display settings.

FIGS. 13A to 13D are diagrams of screen configurations in case that a 3D display level of a first object icon is different from that of a second object icon.

Referring to FIGS. 13A to 13D, the mobile terminal 100 is able to display first to fourth object icons 610 to 640 as a plurality of object icons on the touchscreen.

Figure 13A:
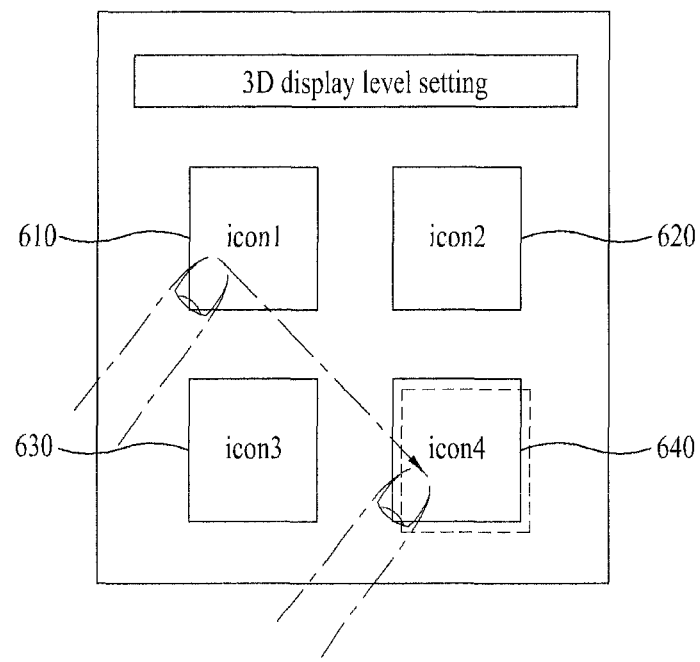
FIGS. 13A to 13D are diagrams of screen configurations in case that a 3D display level of a first object icon is different from that of a second object icon.

Referring to FIG. 13A, the mobile terminal 100 is able to receive an input of a touch & drag action from a first point within the first object icon 610 to a second point within the fourth object icon 640 from a user. In this case, assume that different 3D display levels are set for the first and fourth object icons 610 and 640, respectively. And, assume that a 3D display level is set in a manner that a projected extent of the fourth object icon 640 is set greater than that of the first object icon 610. Therefore, in case that the first and fourth object icons 610 and 640 are displayed in a manner of being overlapped with each other, the first object icon 610 having the 3D display level set to have a relatively small projected extent can be displayed in a manner of being relatively recessed compared to the fourth object icon 640.

Figure 13B:
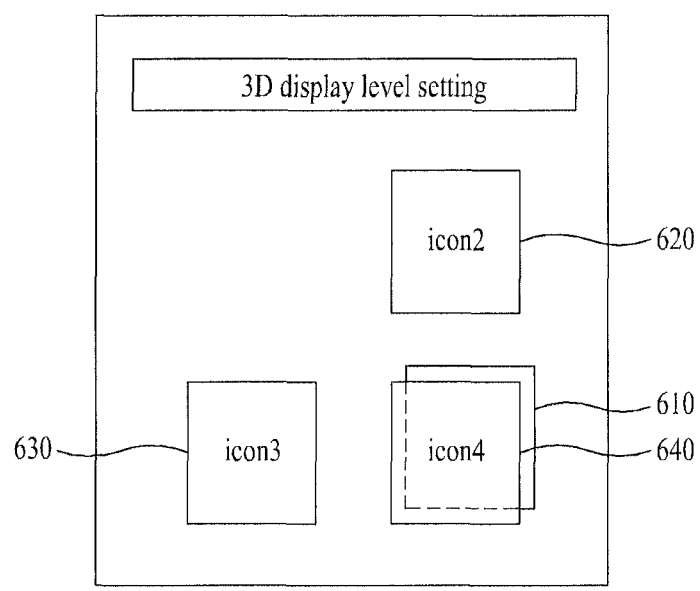

Referring to FIG. 13B, once the touch & drag action is completed, the mobile terminal 100 shifts the first object icon 610 to the fourth object icon 640 and is able to display the first and fourth object icons 610 and 640 to be overlapped with each other.

Figure 13C:
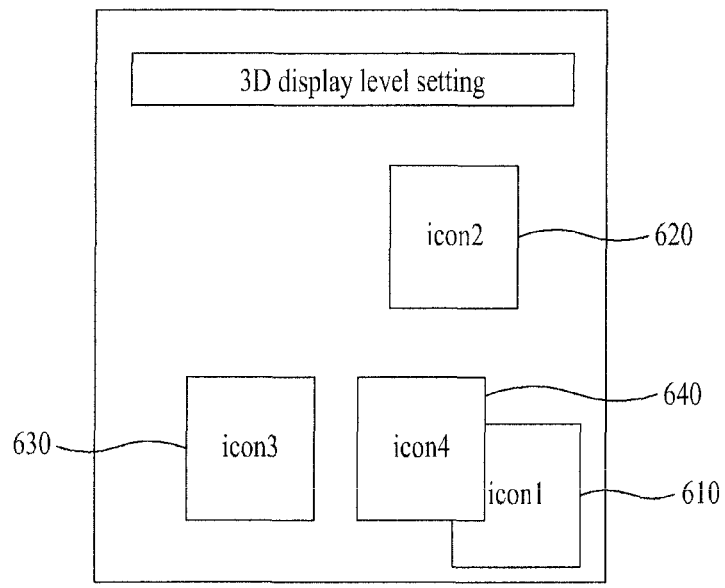

Referring to FIG. 13C, if the touch & drag action is completed, the mobile terminal 100 shifts the first object icon 610 to the fourth object icon 640 and is able to display the first and fourth object icons 610 and 640 to be partially overlapped with each other.

Figure 13D:
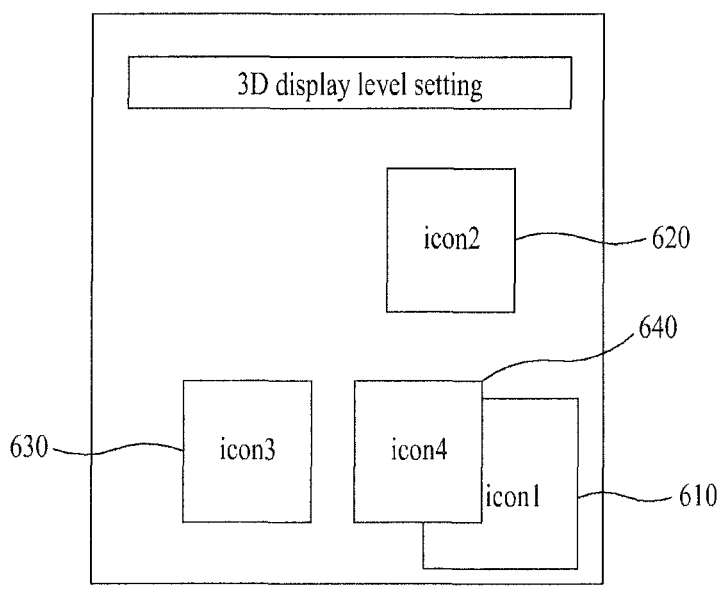

Referring to FIG. 13D, if the touch & drag action is completed, the mobile terminal 100 shifts the first object icon 610 to the fourth object icon 640 and then displays the first and fourth object icons 610 and 640 to be overlapped with each other such that a size of the first object icon 610 is set relatively greater than that of the fourth object icon 640.

In the following description, a method of setting a 3D display level in a mobile terminal according to one embodiment is explained with reference to the accompanying drawings.

Figure 14:
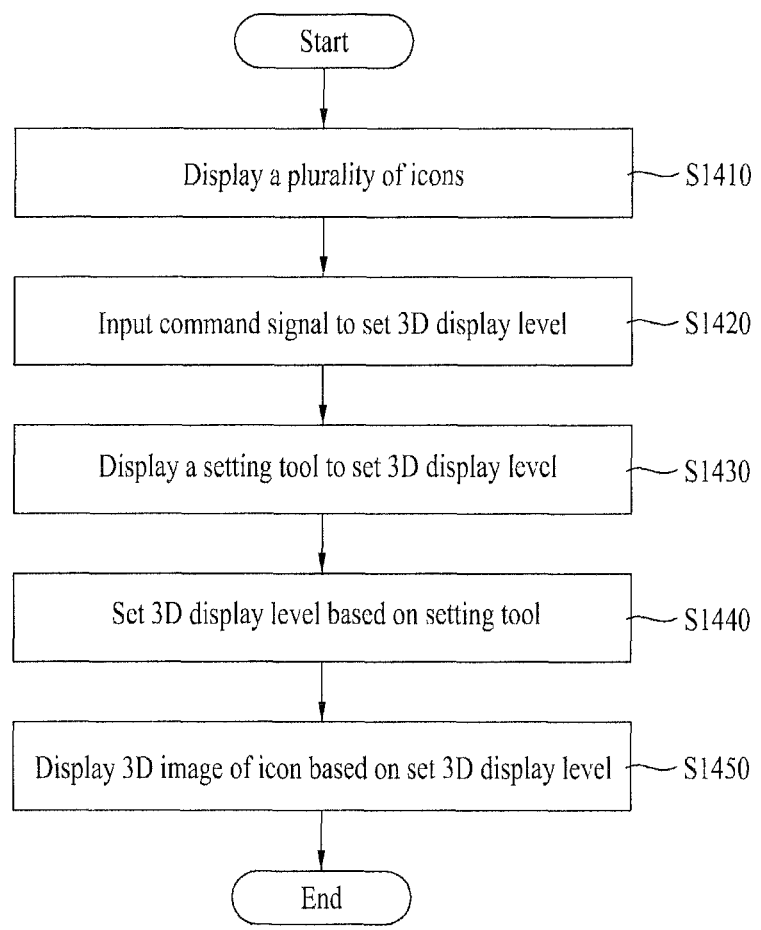
FIG. 14 is a flowchart for a method of setting a 3D display level using a 3D setting means in a mobile terminal according to one embodiment.

FIG. 14 is a flowchart for a method of setting a 3D display level using a 3D setting means in a mobile terminal according to one embodiment.

Referring to FIG. 14, the mobile terminal 100 displays a plurality of object icons on the touchscreen, in step S1410.

The displaying step S1410 can refer to the aforesaid description of the former displaying step S410. And, the following description of the displaying step S1410 is applicable to the former displaying step S10 as well.

The displaying step S1410 can include a state that at least one object icon is displayed in a mode for setting a 3D display level of an object icon (hereinafter named a 3D display level setting mode). And, the display step S1410 can include a state that at least one menu item or at least one image is displayed as an object icon in a menu search mode or an image search mode.

Moreover, the mobile terminal 100 is able to perform a mode switching between the 3D display level setting mode and the menu search mode (or the image search mode). In this case, even if the mode switching is performed, a displayed object icon does not change.

For instance, the 3D display setting mode, the menu search mode or the image search mode can be entered in case of a selection of the corresponding menu item, a selection of a corresponding key zone (or a corresponding key), a detection of a corresponding terminal motion (e.g., a shake once, an inclination at predetermined angle in predetermined direction, etc.) or the like.

In the displaying step S1410, if the object icon is a menu item icon, the mobile terminal 100 displays an identification information (e.g., a name, an identification image, a representative submenu item, etc.) of the corresponding menu item on the object icon. If the object icon is an image of a thumbnail type, the mobile terminal is able to display a corresponding image on the object icon.

The mobile terminal 100 receives an input of a command signal to set a 3D display level from a user, in step S1420.

In particular, the mobile terminal 100 is able to receive the command signal to set the 3D display level in the course of performing the menu search mode or the image search mode.

In case of the 3D display level setting mode, the mobile terminal 100 is able to perform the displaying step S1410 after receiving the input of the 3D display level setting command signal. Namely, the 3D display level setting mode can be entered in case that the 3D display level setting command signal is inputted.

In this case, the 3D display level setting command signal can be inputted if a corresponding menu item, a corresponding key zone or a corresponding key is selected by a user or a motion of the corresponding terminal is detected.

Moreover, the state for receiving the input of the 3D display level setting command signal can refer to the former descriptions with reference to FIG. 5A and FIG. 5B. Meanwhile, the mobile terminal 100 displays a plurality of object icons corresponding to a plurality of menu items in the menu search mode. In case of receiving a selection of a key zone for receiving an input of a 3D setting command signal from a user, the mobile terminal 100 is able to receive an input of the 3D display level setting command signal.

Referring now to FIG. 14, in case of entering the 3D display level setting mode by receiving the input of the 3D display level setting command signal in the inputting step S1420, the mobile terminal 100 displays a 3D display level setting tool (hereinafter named a 3D setting tool) for a specific one of a plurality of the object icons under the control of the controller 180, in step S1430.

In the displaying step S1430, the mobile terminal 100 is able to display the 3D setting tool for each of a plurality of the currently displayed object icons. And, the mobile terminal 100 is able to display the 3D setting tool for the object icon selected by the user only.

Moreover, in the displaying step S1430, the mobile terminal 100 may display the 3D setting tool for the object icon, which is being 3-dimensionally or 2-dimensionally displayed, among a plurality of the object icons.

In the displaying step S1430, the mobile terminal 100 is able to display an individual 3D setting tool for each object icon or is able to display a common 3D setting tool in common to a plurality of the object icons.

In the displaying step S1430, the mobile terminal 100 is able to display the object icon displayed together with the 3D setting tool in a manner of zooming in on the object icon and the corresponding 3D setting tool or is able to display the object icon displayed together with the 3D setting tool on a whole screen. This is to facilitate a manipulation of the 3D setting tool.

In the displaying step S1430, in case of displaying a specific object icon before displaying the 3D setting tool, the mobile terminal 100 is able to display the specific object icon 2-dimensionally before or as soon as the 3D setting tool under the control of the controller 180.

In the following description, the 3D setting tool displaying step S1430 is explained in detail with reference to the accompanying drawings.

Figure 15A:
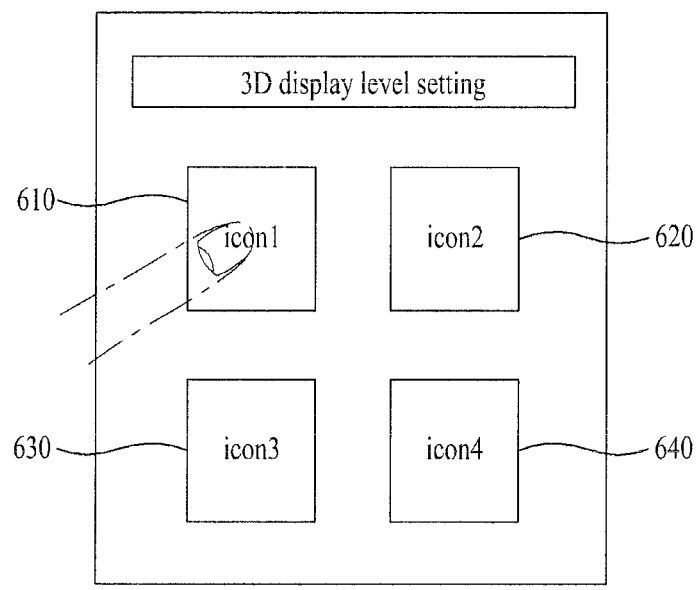
FIGS. 15A to 15C are diagrams of screen configurations for displaying a 3D setting means for an object icon in a 3D display level setting mode.
Figure 15B:
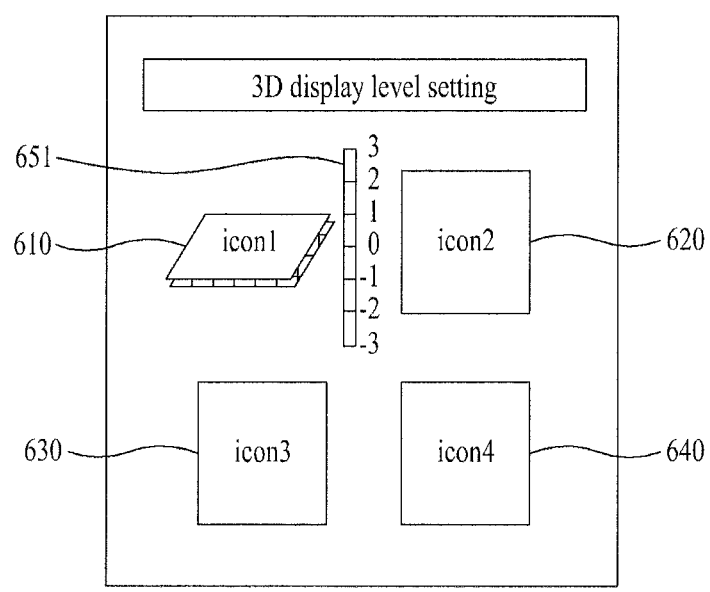
Figure 15C:
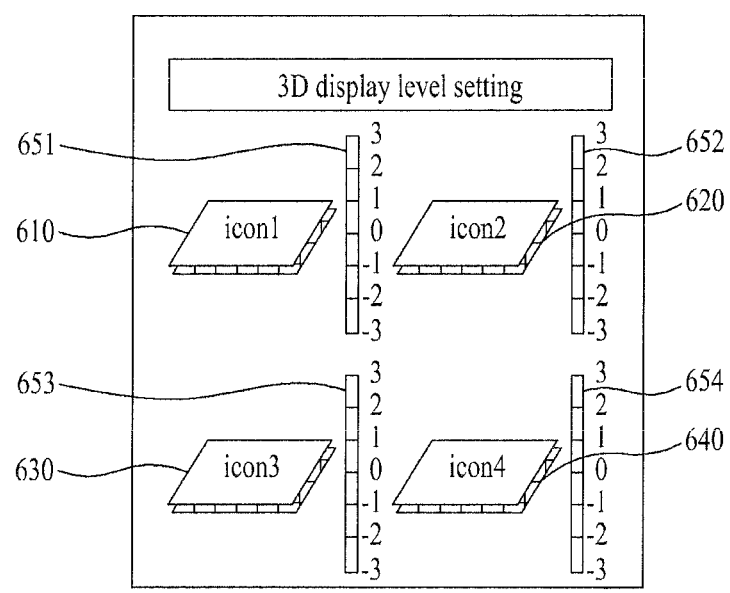

FIGS. 15A to 15C are diagrams of screen configurations for displaying a 3D setting means for an object icon in a 3D display level setting mode. For clarity of the following description, a plurality of icons are limited to object icons 1 to 4.

Referring to FIG. 15A, in case of entering a 3D display level setting mode, the mobile terminal is able to display a first through fourth object icons 610 to 640 on a screen and is able to receive a touch action performed on the first object icon 610 among the four object icons 610 to 640.

In this case, the touch action performed on the first object icon 610 can have a touch pattern corresponding to a 3D display level setting command for the first object icon 610. For instance, the touch pattern can include one of a long touch over a predetermined duration, a multiple time touch (e.g., a multi-touch), a touch at plural points (e.g., a multi-point touch), a specific touch action and the like.

In case of receiving an input of a touch action performed on the first object icon 610 in FIG. 15A, if the object icon 1 610 is being 3D-displayed in FIG. 15A, the mobile terminal 100 may display the first object icon 610 in 2D and is able to display a first 3D setting tool 651 for the first object icon 610, as shown in FIG. 15B.

In this case, a size, display shape, position and the like of the first object icon 610 can be modified to be suitable for the setting of the 3D display level. The switching to the 2D display from the 3D display is one example of the modification.

Therefore, a user is able to select a 3D display level to set for the first object icon 610 using the first 3D setting tool 651.

Referring to FIG. 15C, in case of entering the 3D display level setting mode, the mobile terminal 100 is able to display first to fourth setting tools 651 to 654 for the four object icons 610 to 640, respectively.

In this case, the object icon having the 3D display level designated in advance among the four object icons 610 to 640 can be displayed in 2D.

Therefore, a user is able to select a 3D display level to set for each of the object icons 610 to 640 using one of the first to fourth 3D setting tools 651 to 654.

FIGS. 16A to 16D are diagrams of screen configurations for displaying a 3D setting tools for an object icon in a menu search mode. For clarity of the following description, a plurality of icons are limited to the first through fourth object icons 610 to 640.

Figure 16A:
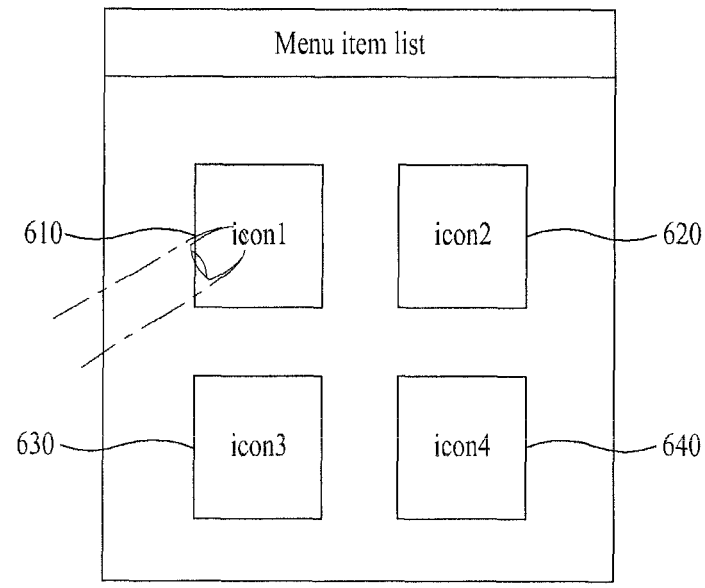
FIGS. 16A to 16D are diagrams of screen configurations for displaying a 3D setting means for an object icon in a menu search mode.
Figure 16B:
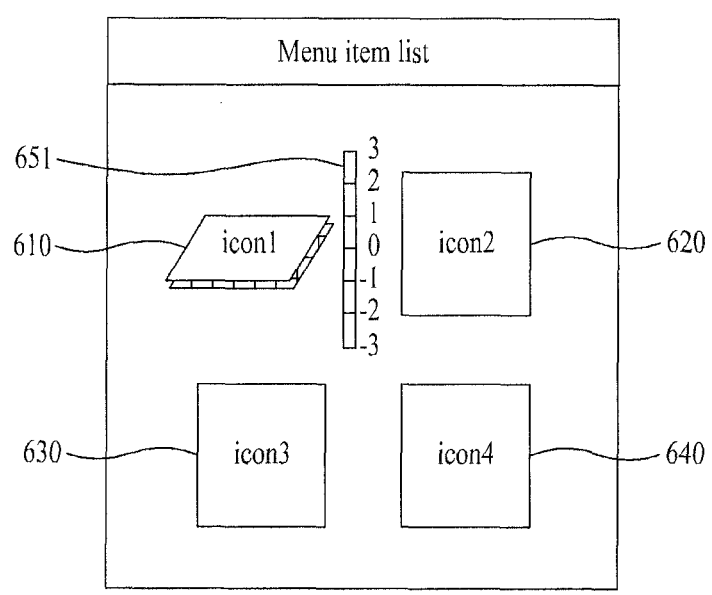

Referring to FIGS. 16A to 16B, in case of entering a menu search mode, the mobile terminal is able to display the object icons 610 to 640 on a screen and is able to receive a touch action performed on the first object icon 610.

In this case, the touch action performed on the first object icon 610 can have a touch pattern corresponding to a 3D display level setting command for the first object icon 610.

As the mobile terminal 100 receives the touch action performed on the first object icon 610, the mobile terminal 100 is able to receive an input of a 3D display level setting command signal for the first object icon. In particular, a setting command signal for a specific object icon, which is selected by a user from all object icons currently displayed, can be inputted only.

In case of receiving an input of a touch action performed on the first object icon 610 in FIG. 16A, if the first object icon 610 is being 3D-displayed in FIG. 16A, the mobile terminal 100 displays the first object icon 610 in 2D and is able to display a first 3D setting tool 651 for the first object icon 610, as shown in FIG. 16B.

Therefore, a user is able to select a 3D display level to be set for the first object icon 610 using the first 3D setting tool 651.

Figure 16C:
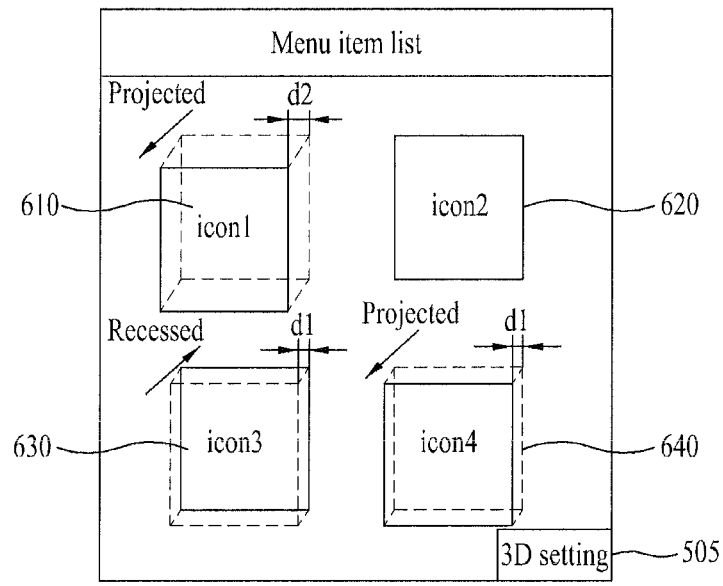
Figure 16D:
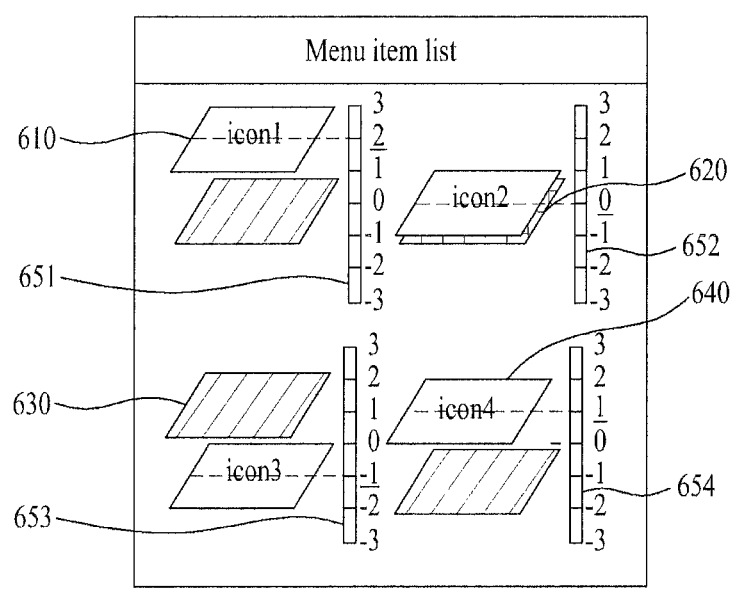

Referring to FIGS. 16C to 16D, the mobile terminal 100 displays the object icons 610 to 640 on a screen in the menu search mode and is able to display a key zone 505 for receiving an input of a 3D display level setting command on a prescribed region of the screen, as shown in FIG. 16A.

In this case, the object icons 610 to 640 are displayed in a manner of being projected or recessed according to the 3D display levels set for them, respectively.

If a user selects the key zone 505 in FIG. 16C, the mobile terminal 100 receives an input of a 3D display level setting command signal and is then able to display first to fourth 3D setting tools 651 to 654 for the first to fourth object icons 610 to 640, respectively.

In this case, the object icons 610 to 640 previously displayed in 3D can be displayed in 2D. The 3D display levels respectively set for the object icons 610 to 640 can be displayed on the corresponding 3D setting means 651 to 654, respectively. Moreover, the object icons 1 to 4 610 to 640 can be displayed at positions corresponding to the previously set 3D display levels, respectively.

For instance, if the 3D display level of the first object icon 610 is set to a projected display level 2, the first object icon 610 can be displayed at the position corresponding to the projected display level 2. And, an indictor corresponding to the projected display level 2 can be identifiably displayed within the first 3D setting tool 651.

Therefore, a user is able to select 3D display levels for the first to fourth object icons 610 to 640 using the first to fourth 3D setting tools 651 to 654, respectively.

Referring again to FIG. 14, the mobile terminal 100 sets a 3D display level of the object icon using the displayed 3D setting tool under the control of the controller 180, in step S1440.

In the 3D setting tools, indicators respectively corresponding to a plurality of 3D display levels are included. If a specific indicator corresponding to a specific 3D display level is selected from a plurality of the indicators included in the 3D setting tool, the controller 180 is able to set a specific 3D display level for a specific object icon.

As mentioned in the foregoing description, the 3D setting tool can include an individual 3D setting tool or a common 3D setting tool.

In case of using the individual 3D setting tool, the mobile terminal 100 is able to set a 3D display level of a corresponding object icon using the individual 3D setting tool for the object icon having the individual 3D setting tool displayed thereon.

In case of using the common 3D setting tool, while a plurality of object icons and the common 3D setting tool are displayed, if a specific object icon is selected, the mobile terminal 100 is able to set a 3D display level for the selected object icon using a representative 3D setting tool.

In the following description, a process for setting a 3D display level of an object icon using a 3D setting tool is explained in detail with reference to the accompanying drawings. For clarity of the following description, assume that a 3D setting tool 651 is displayed for the first object icon 610.

The 3D setting tool 651 explained in the following description includes first to third projection indicators 1, 2 and 3 corresponding to first to third projected 3D display levels, respectively. And, the 3D setting means 651 is able to include first to third recess indicators −1, −2 and −3 corresponding to first to third recessed 3D display levels, respectively.

FIGS. 17A to 17F are diagrams for a process for setting a 3D display level according to one embodiment.

Figure 17A:
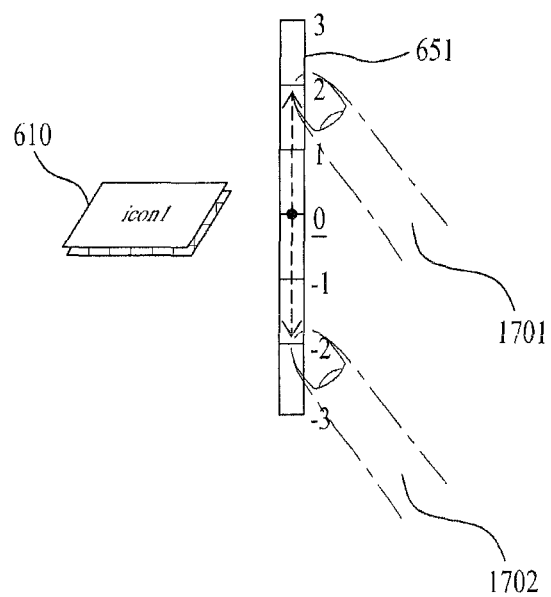
FIGS. 17A to 19C are diagrams for setting a 3D display level of a corresponding object icon using a 3D setting means.
Figure 17B:
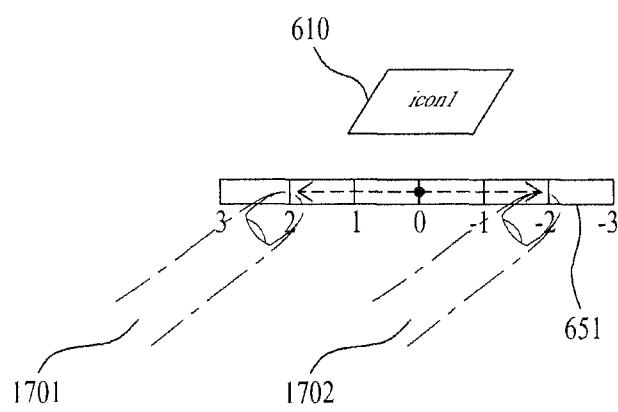
Figure 17C:
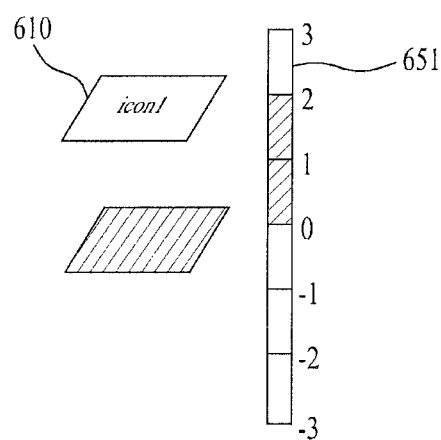
Figure 17D:
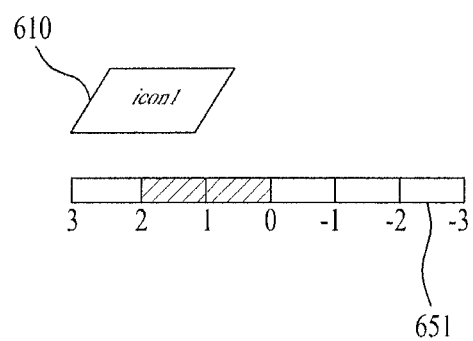
Figure 17E:
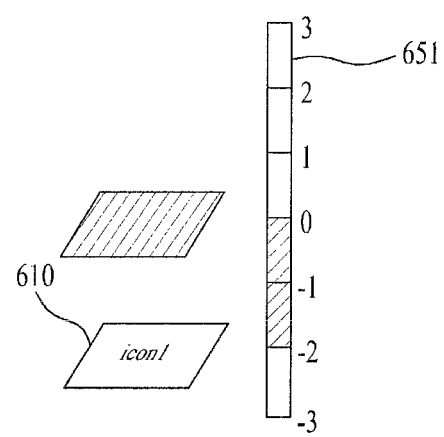
Figure 17F:
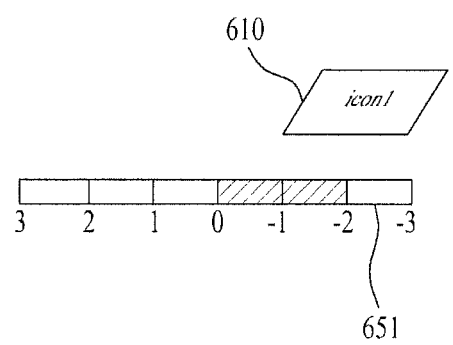

The 3D setting tool 651 shown in FIG. 17A, FIG. 17C and FIG. 17E are represented in a vertical direction, while the 3D setting tool 651 shown in FIG. 17B, FIG. 17D and FIG. 17F are represented in a horizontal direction.

Referring to FIGS. 17A and 17B, the mobile terminal 100 receives an input of a touch & drag action performed on a second projection indicator 2 displayed on the 3D setting tool 651 or a touch action performed on the second projection indicator 2 (1701), or an input of a touch & drag action performed on a second recess indicator −2 displayed on the 3D setting tool 651 or a touch action performed on the second recess indicator −2 (1702).

Referring to FIGS. 17C and 17D, in the case of 1701 as shown in FIG. 17A, the mobile terminal displays the first object icon 610 at the position corresponding to the second projection indicator 2 and is able to identifiably display a region ranging from a reference point 0 to the second projection indicator 2 [oblique line display].

Therefore, the mobile terminal 100 is able to set a second projected 3D display level corresponding to the second projection indicator 2 for the first object icon 610.

Referring to FIGS. 17E and 17F, in the case 1702 as shown in FIG. 17A, the mobile terminal displays the first object icon 610 at the position corresponding to the second recess indicator −2 and is able to identifiably display a region ranging from a reference point 0 to the second recess indicator −2 [shaded display].

Therefore, the mobile terminal 100 is able to set a second recessed 3D display level corresponding to the second recess indicator −2 for the first object icon 610.

FIGS. 18A to 18F are diagrams for a process for setting a 3D display level according to another embodiment.

Figure 18A:
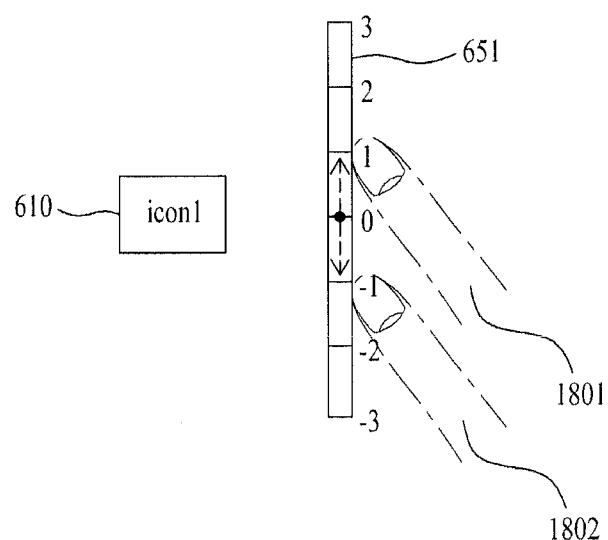
Figure 18B:
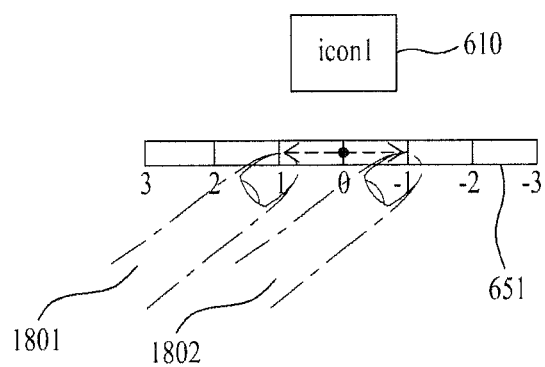
Figure 18C:
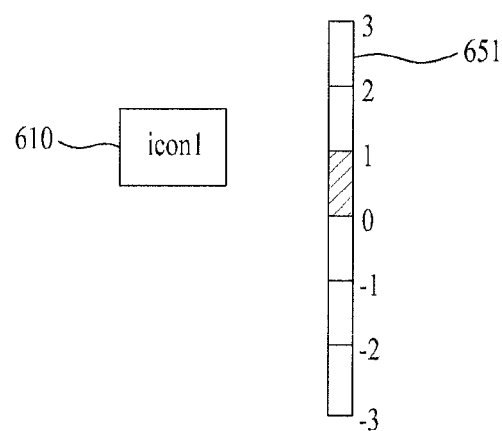
Figure 18D:
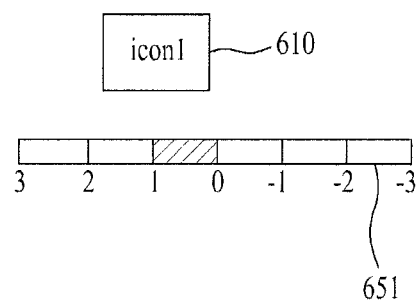
Figure 18E:
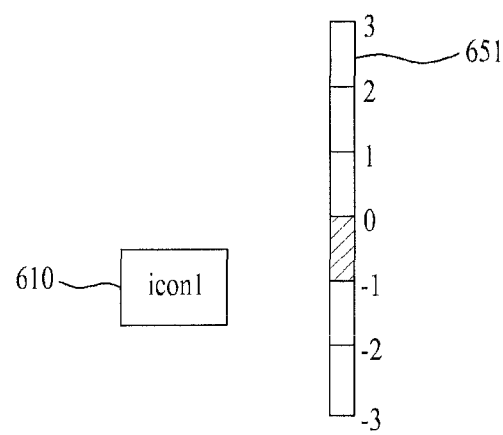
Figure 18F:
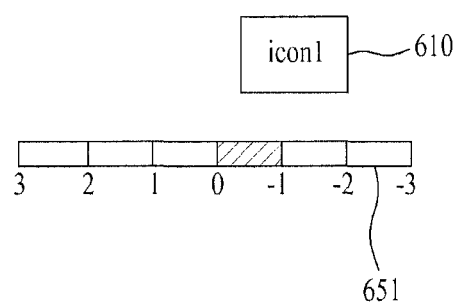

The 3D setting tool 651 shown in FIG. 18A, FIG. 18C and FIG. 18E are represented in a vertical direction, while the 3D setting tool 651 shown in FIG. 18B, FIG. 18D and FIG. 18F are represented in a horizontal direction.

Referring to FIGS. 18A and 18B, the mobile terminal 100 receives an input of a touch & drag action performed on a first projection indicator 1 displayed on the 3D setting tool 651 or a touch action performed on the first projection indicator 1 (1801) or an input of a touch & drag action performed on a first recess indicator −1 displayed on the 3D setting tool 651 or a touch action performed on the first recess indicator −1 (1802).

Referring to FIGS. 18C and 18D, in the case 1801 shown in FIG. 18A, the mobile terminal displays the first object icon 610 at the position corresponding to the first projection indicator 1 and is able to identifiably display a region ranging from a reference point 0 to the first projection indicator 1 [oblique line display].

Therefore, the mobile terminal 100 is able to set a first projected 3D display level corresponding to the first projection indicator 1 for the object icon 1 610.

Referring to FIGS. 18E and 18F, in the case 1802 shown in FIGS. 18A and 18B, the mobile terminal displays the first object icon 610 at the position corresponding to the first recess indicator −1 and is able to identifiably display a region ranging from a reference point 0 to the first recess indicator −1 [shaded display].

Therefore, the mobile terminal 100 is able to set a first recessed 3D display level corresponding to the first recess indicator −1 for the first object icon 610.

Figure 19A:
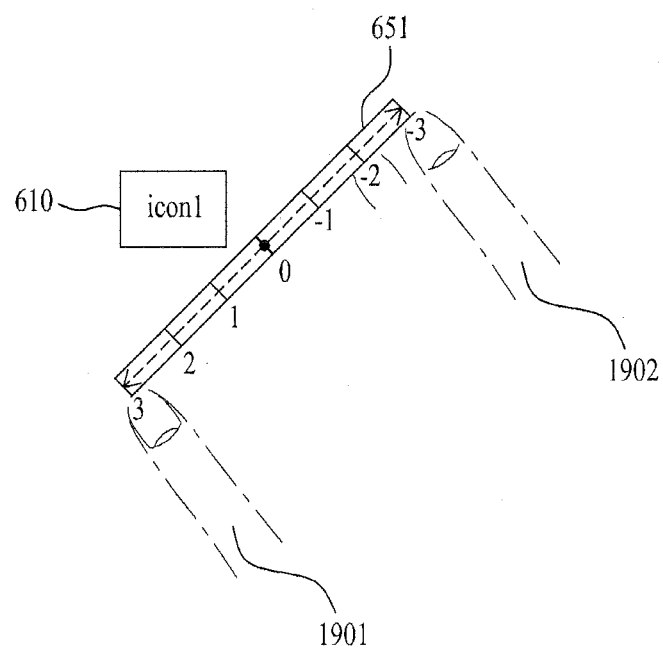
Figure 19B:
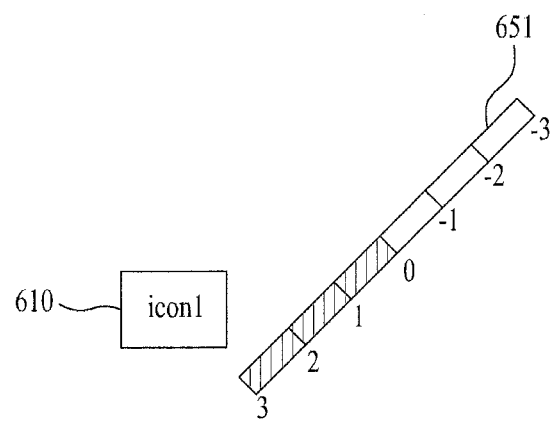
Figure 19C:
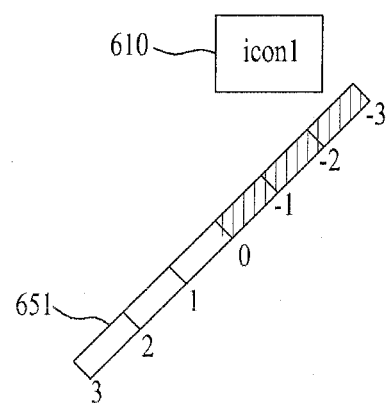

FIGS. 19A to 19C are diagrams illustrating a process for setting a 3D display level according to an embodiment.

The 3D setting tool 651 shown in FIGS. 19A to 19C can be displayed in a manner of being inclined at a predetermined angle in a predetermined direction.

Referring to FIG. 19A, the mobile terminal 100 receives an input of a touch & drag action performed on a third projection indicator 3 displayed on the 3D setting tool 651 or a touch action performed on the third projection indicator 3 (1901), or an input of a touch & drag action performed on a third recess indicator −3 displayed on the 3D setting tool 651 or a touch action performed on the third recess indicator −3 (1902).

Referring to FIG. 19B, in the case 1901 shown in FIG. 19A, the mobile terminal displays the first object icon 610 at the position corresponding to the third projection indicator 3 and is able to identifiably display a region ranging from a reference point 0 to the third projection indicator 3 [oblique line display].

Therefore, the mobile terminal 100 is able to set a third projected 3D display level corresponding to the third projection indicator 3 for the first object icon 610.

Referring to FIG. 19C, in the case 1902 shown in FIG. 19A, the mobile terminal displays the object icon 1 610 at the position corresponding to the third recess indicator −3 and is able to identifiably display a region ranging from a reference point 0 to the third recess indicator −3 [shaded display].

Therefore, the mobile terminal 100 is able to set a third recessed 3D display level corresponding to the third recess indicator −3 for the first object icon 610.

Referring again to FIG. 14, the mobile terminal 100 displays the specific object icon in a manner that the object icon is recessed or projected according to the 3D display level set in the setting step S1440 under the control of the controller 180. In this case, the displaying step S1450 can be performed using the touchscreen.

The displaying step S1450 can be performed in case of receiving an input of a return command signal for returning to the object icon display state after completion of the 3D display level setting of the object icon.

For instance, the return command signal can be performed if a corresponding key zone, a corresponding key or a corresponding menu item is selected or a corresponding terminal motion is detected.

In case of setting the 3D display level of the specific object icon, the displaying step S1450 can be performed if a touch action corresponding to a return command for the specific object icon is inputted.

For instance, the touch action can include one of a touch over a predetermined duration, touches over a predetermined count, a multi-point touch at plural points, a touch action of a specific pattern and the like.

In the displaying step S1450, the mobile terminal 100 is able to display the specific object icon in a manner of projecting or recessing the specific object icon according to a projected or recessed distance of the 3D display level set in the setting step S1440.

For clarity of the following description assume that the 3D display level includes total of seven levels (e.g., a level having a recessed/projected distance set to 0, etc.). And, assume that three projected display levels and three recessed display levels are included in the total seven levels.

Moreover, projected distances d1, d2 and d3 are designated to the first to third projected 3D display levels, respectively. In this case, a projected extent can be set to increase in order of d1, d2 and d3. And, recessed distances −d1, −d2 and −d3 are designated to the first to third recessed 3D display levels, respectively. In this case, a recessed extent can be set to increase in order of −d1, −d2 and −d3.

Optionally, the projected/recessed distance per 3D display level is designated by a user or can be determined by the terminal itself.

Prescribed object icons among a plurality of the displayed object icons have the same 3D display level or can differ from each other in 3D display level. The object icons having the same 3D display level set are displayed in 3D to the same projected/recessed extent. And, the object icons having different 3D display levels set can be 3D displayed to the different projected/recessed extents, respectively.

The displaying step S1450 is explained in detail with reference to the accompanying drawings as follows.

Figure 20A:
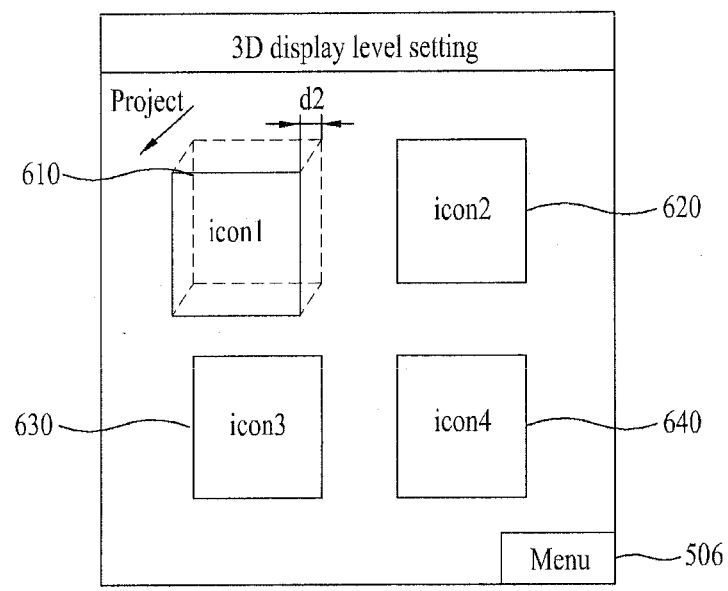
FIGS. 20A to 20D are diagrams of screen configurations for a switching process between a 3D display level setting mode and a menu search mode.
Figure 20B:
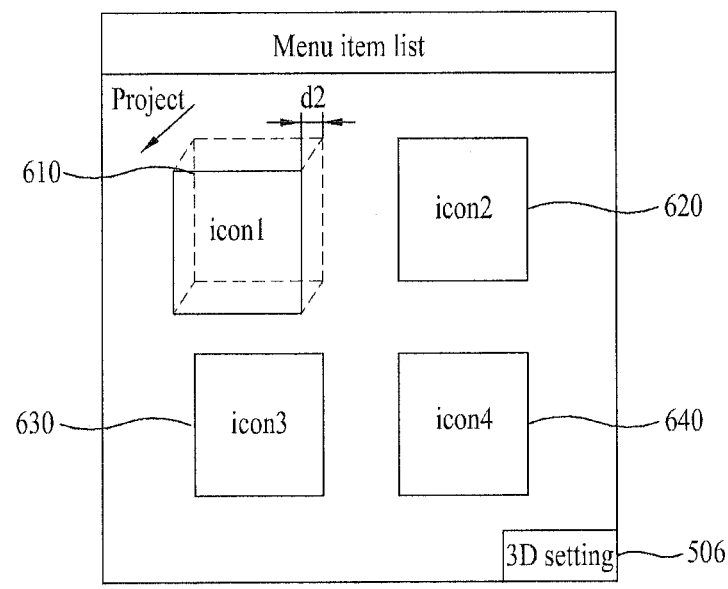

Referring to FIGS. 20A and 20B, in case that the second projected 3D display level (e.g., the projected distance d2) is set for the first object icon in the 3D display level setting mode, as shown in FIG. 20A, or the menu search mode, as shown in FIG. 20B, the mobile terminal 100 is able to display the object icon 610 in a manner of projecting the object icon 610 by the projected distance d2.

Figure 20C:
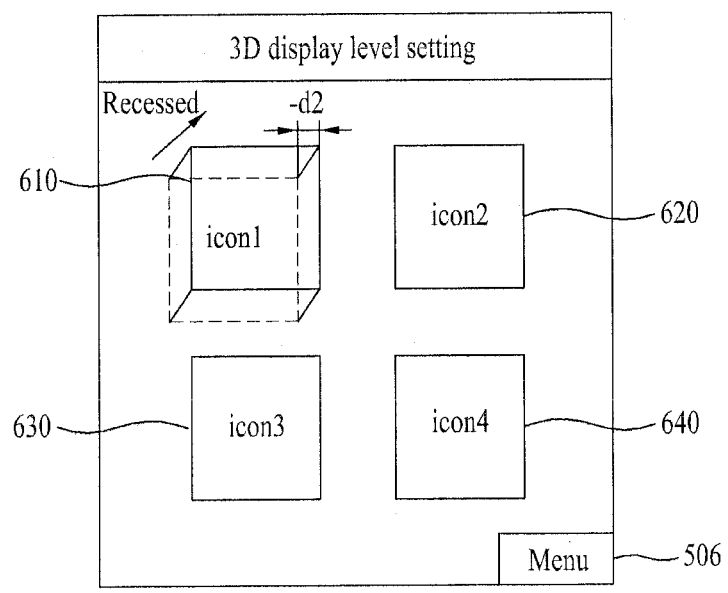
Figure 20D:
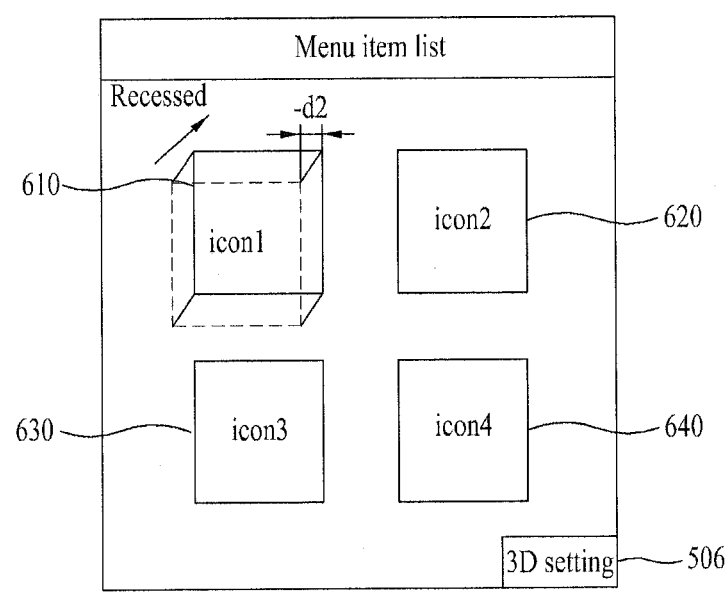

Referring to FIGS. 20C and 20D, in case that the second recessed 3D display level (e.g., the recessed distance −d2) is set for the object icon 610 in the 3D display level setting mode, as shown in FIG. 20C, or the menu search mode, as shown in FIG. 20D, the mobile terminal 100 is able to display the object icon 610 in a manner of recessing the object icon 610 by the recessed distance −d2.

Moreover, if a menu region 506 is selected in FIG. 20A or FIG. 20C, the menu search mode is entered to configure the screen shown in FIG. 20B or FIG. 20D. If a 3D setting region 505 is selected in FIG. 20B or FIG. 20D, the 3D display level setting mode is entered to configure the screen shown in FIG. 20A or FIG. 20C.

Accordingly, the following effects and/or advantages are provided herein.

First of all, a 3D display level for each of a plurality of object icons may be effectively set.

Secondly, if a first object icon is shifted to a position at which a second object icon is located among a plurality of object icons, the display of the first and second object icons may be effectively controlled according to a 3D display level set for each of the first and second object icons.

In one embodiment, the above-described object icon displaying methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, the present invention is directed to a mobile terminal and object icon displaying method therein that substantially obviate one or more problems due to limitations and disadvantages of the related art.

An object of the present application or patent is to provide a mobile terminal and object icon displaying method therein, by which a 3D (3-dimensional) display level of each of a plurality of object icons can be set.

Another object of the present application or patent is to provide a mobile terminal and object icon displaying method therein as follows. First of all, if a first object icon among a plurality of object icons is shifted to a point, at which a second object icon is located, a display of each of the first and second object icons can be controlled according to a 3D display level of the corresponding object icon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of this application or patent, as embodied and broadly described herein, a mobile terminal includes a touchscreen displaying a plurality of object icons, the touchscreen receiving an input of a touch action for setting a 3D display level of a specific one of a plurality of the displayed object icons and a controller setting the 3D display level of the specific object icon according to a pattern of the inputted touch action, the controller controlling the touchscreen to display the specific object icon in a manner of projecting or recessing the specific object icon 3-dimensionally to correspond to the set 3D display level.

In another aspect of the present application or patent, a mobile terminal includes a touchscreen displaying a plurality of object icons 3-dimensionally to correspond to a 3D display level set for each of a plurality of the object icons, the touchscreen receiving an input of a touch action for shifting a first one of a plurality of the displayed object icons and a controller shifting the first object icon to a specific point according to the inputted touch action, the controller, if a second object icon is displayed at the specific point, determining whether the 3D display level of the first object icon is equal to that of the second object icon. In this case, if the 3D display level of the first object icon is equal to that of the second object icon, the touchscreen displays the first and second object icons not to be overlapped with each other under the control of the controller. If the 3D display level of the first object icon is not equal to that of the second object icon, the touchscreen displays the first and second object icons to be overlapped with each other under the control of the controller.

In another aspect of the present application or patent, a method of displaying an object icon in a mobile terminal includes the steps of displaying a plurality of object icons, receiving an input of a touch action for setting a 3D display level of a specific one of a plurality of the displayed object icons, setting the 3D display level of the specific object icon according to a pattern of the inputted touch action, and displaying the specific object icon in a manner of projecting or recessing the specific object icon 3-dimensionally to correspond to the set 3D display level.

In a further aspect of the present application or patent, a method of displaying an object icon in a mobile terminal includes the steps of displaying a plurality of object icons 3-dimensionally to correspond to a 3D display level set for each of a plurality of the object icons, receiving an input of a touch action for shifting a first one of a plurality of the displayed object icons, shifting the first object icon to a specific point according to the inputted touch action, if a second object icon is displayed at the specific point, determining whether the 3D display level of the first object icon is equal to that of the second object icon, if the 3D display level of the first object icon is equal to that of the second object icon, displaying the first and second object icons not to be overlapped with each other, and if the 3D display level of the first object icon is not equal to that of the second object icon, displaying the first and second object icons to be overlapped with each other.

A display module in a mobile terminal, as embodied and broadly disclosed herein, may include a touchscreen configured to display a plurality of icons and to receive a touch input that sets a 3D display setting for at least one of the icons; and a controller configured to set the 3D display setting according to a pattern of the touch input, wherein the touch pattern determines whether the icon is perceived to project or recede into the touch screen and/or a magnitude of a projection or recession.

The at least one icon may include a menu item or a thumbnail image. The controller may be configured to set the 3D display setting for the at least one icon to a default value prior to receiving the touch input. Moreover, the touch pattern may be a first touch pattern that displays the icon to project or recede from the touchscreen by a first distance or a second touch pattern that displays the icon to project or recede from the touchscreen by a second distance, wherein the touchscreen may be configured to receive a second touch input after the touch input, the second touch input having the first or second touch pattern.

In this embodiment, in response to the second touch input, the controller may set the 3D display setting to display the icon to project or recede from the touchscreen by a distance corresponding to the second touch input. Moreover, in response to the second touch input, the controller may set the 3D display setting to increase the magnitude of projection or recession of the icon by a distance corresponding to the second touch input.

In response to the second touch input, the controller may set the 3D display setting to decrease the magnitude of projection or recession of the icon by a distance corresponding to the second distance. In response to a third touch input, the controller may set the 3D display setting to display the icon without the perceived projection or recession. Moreover, the controller controls the icon to display a different image based on the magnitude of the perceived projection or recession of the icon, wherein, if the icon is displayed to protrude or recede at a first distance, displaying a first image on the icon, and if the icon is displayed to protrude or recede at a second distance, displaying the second image on the icon. The first and second images include at least one selectable menu item for controlling an application program running in the mobile terminal.

The touchscreen may display a 3D settings tool for setting the 3D display setting for the at least one icon, and wherein the controller sets the 3D display setting for the icon based on an input on the settings tool. In this embodiment, in response to a fourth touch input to move the first icon to overlap the second icon, the first and second icons may overlap each other if the perceived magnitude of projection or recession of the first and second icons are different, or the first icon may be displayed adjacent to the second icon if the perceived magnitude of projection or recession of the first and second icons are the same. The fourth touch input may be a touch & drag input on the touchscreen.

In another embodiment, a method of displaying an icon in a mobile terminal may include displaying a plurality of icons; receiving a touch input for setting a 3D display level of one of the plurality of the displayed icons; setting the 3D display level of the one of the plurality of icons according to the received touch input, wherein the touch input determines whether the at least one icon is perceived to project or recede into the touch screen and/or a magnitude of a projection or recession; and displaying a three-dimensional image of the at least one icon based on the set 3D display level.

In another embodiment, a touchscreen display in a mobile terminal may include a means for displaying a plurality of icons; a means for receiving a touch input at one of the plurality of icons to set a 3D display setting for the icon; a means for determining whether the touch input has a first touch pattern or a second touch pattern, wherein the first touch pattern corresponds to a first 3D display setting that configures the icon to be perceived to project from the touchscreen display, and the second touch pattern corresponds to a second 3D display setting that configures the icon to be perceived to recede into the touchscreen display; and a means for displaying the icon based on the touch input.

In this embodiment, the touchscreen display may further include a means for displaying a different image on the at least one icon based on a perceived depth of the icon on the touchscreen. and a means for displaying a 3D display settings tool in response to receiving the touch input, wherein the 3D display settings tool is a scroll bar configured to set the 3D display setting.

Moreover, the touchscreen display may include a means for displaying a first 3D image at a first area of a display; a means for displaying a second 3D image at a second area of the display, wherein the first and second 3D images include a 3D display setting that controls a perceived depth of the 3D image on the display; a means for receiving an input to move the first 3D image from the first area to the second area; a means for comparing the 3D display settings of the first and second 3D images; and a means for moving the first 3D image on the display, wherein if the 3D display settings of the first and second 3D images are different, moving the first 3D image to overlap the second 3D image, and if the 3D display settings of the first and second 3D images are the same, moving the first 3D image to a third area of the display that does not overlap the second area.

It is to be understood that both the foregoing general description and the following detailed description of the present application or patent are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display module in a mobile terminal comprising:
a touchscreen configured to display a plurality of icons and to receive a touch input that sets a 3D display setting for at least one of the icons; and
a controller configured to set the 3D display setting according to a pattern of the touch input among a plurality of prescribed touch patterns, wherein
the touch pattern determines whether the icon is perceived to project or recede into the touch screen and/or a magnitude of a projection or recession by changing a 3D display level of the icon,
wherein, in response to another touch input to move a first icon to overlap a second icon,
the first and second icons overlap each other if the perceived magnitude of projection or recession of the first and second icons are different, or
the first icon is displayed adjacent to the second icon if the perceived magnitude of projection or recession of the first and second icons are the same.

2. The display module of claim 1, wherein the at least one icon includes a menu item or a thumbnail image.

3. The display module of claim 1, wherein the controller is configured to set the 3D display setting for the at least one icon to a default value prior to receiving the touch input.

4. The display module of claim 1, wherein the touch pattern is a first touch pattern that displays the at least one icon to project or recede from the touchscreen by a first distance or a second touch pattern that displays the icon to project or recede from the touchscreen by a second distance.

5. The display module of claim 4, wherein the touchscreen is configured to receive a subsequent touch input after the touch input, the subsequent touch input having the first or second touch pattern.

6. The display module of claim 5, wherein, in response to the subsequent touch input, the controller sets the 3D display setting to display the icon to project or recede from the touchscreen by a distance corresponding to the subsequent touch input.

7. The display module of claim 4, wherein, in response to the touch input, the controller sets the 3D display setting to increase the magnitude of projection or recession of the at least one icon by a distance corresponding to the touch input.

8. The display module of claim 4, wherein, in response to the touch input, the controller sets the 3D display setting to decrease the magnitude of projection or recession of the at least one icon by a distance corresponding to the second distance.

9. The display module of claim 1, wherein, in response to the touch input, the controller sets the 3D display setting to display the at least one icon without the perceived projection or recession.

10. The display module of claim 1, wherein the controller controls the at least one icon to display a different image based on the magnitude of the perceived projection or recession of the at least one icon.

11. The display module of claim 10, wherein,
if the at least one icon is displayed to protrude or recede at a first distance, displaying a first image on the at least one icon, and
if the at least one icon is displayed to protrude or recede at a second distance, displaying the second image on the at least one icon.

12. The display module of claim 11, wherein the first and second images include at least one selectable menu item for controlling an application program running in the mobile terminal.

13. The display module of claim 1, wherein the touchscreen displays a 3D settings tool for setting the 3D display setting for the at least one icon, and wherein the controller sets the 3D display setting for the at least one icon based on an input on the settings tool.

14. The mobile terminal of claim 1, wherein the touch input to move the first icon to overlap the second icon is a touch & drag input on the touchscreen.

15. A method of displaying an icon in a mobile terminal, comprising:
displaying a plurality of icons;
receiving a touch input among a plurality of prescribed touch patterns for setting a 3D display level of at least one of the plurality of the displayed icons;
setting the 3D display level of the at least one of the plurality of icons according to the received touch input, wherein the touch input determines whether the at least one icon is perceived to project or recede into the touch screen and/or a magnitude of a projection or recession; and
displaying a three-dimensional image of the at least one icon based on the set 3D display level,
wherein, in response to another touch input to move a first icon to overlap a second icon,
displaying the first and second icons to overlap each other if the perceived magnitude of projection or recession of the first and second icons are different, or
displaying the first icon to be adjacent to the second icon if the perceived magnitude of projection or recession of the first and second icons are the same.

16. A touchscreen display in a mobile terminal, comprising:
a means for displaying a plurality of icons;
a means for receiving a touch input among a plurality of prescribed touch patterns at one of the plurality of icons to set a 3D display setting for the icon;
a means for determining whether the touch input has a first touch pattern or a second touch pattern, wherein the first touch pattern corresponds to a first 3D display setting that configures the icon to be perceived to project from the touchscreen display by changing a 3D display level of the icon, and the second touch pattern corresponds to a second 3D display setting that configures the icon to be perceived to recede into the touchscreen display by changing the 3D display level of the icon;

a means for displaying the icon based on the touch input;

a means for displaying a first 3D image at a first area if the display;

a means for displaying a second 3D image at a second area of the display, wherein the first and second 3D images include a 3D display setting that controls a perceived depth of the 3D image on the display;

a means for receiving an input to move the first 3D image from the first area to the second area;

a means for comparing the 3D display settings of the first and second 3D images; and a means for moving the first 3D image on the display, wherein if the 3D display settings of the first and second 3D images are different, moving the first 3D image to overlap the second 3D image, and if the 3D display settings of the first and second 3D images are the same, moving the first 3D image to a third area of the display that does not overlap the second area.

17. The touchscreen display of claim 16, further comprising:

a means for displaying a different image on the at least one icon based on a perceived depth of the icon on the touchscreen.

18. The touchscreen display of claim 16, further comprising:

a means for displaying a 3D display settings tool in response to receiving the touch input, wherein the 3D display settings tool is a scroll bar configured to set the 3D display setting.

* * * * *